US008056162B2

(12) United States Patent
Newkirk et al.

(10) Patent No.: US 8,056,162 B2
(45) Date of Patent: Nov. 15, 2011

(54) PATIENT SUPPORT APPARATUS WITH MOTORIZED TRACTION CONTROL

(75) Inventors: David C. Newkirk, Lawrenceburg, IN (US); Richard H. Heimbrock, Cincinnati, OH (US); David W. Hornbach, Brookville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 12/961,768

(22) Filed: Dec. 7, 2010

(65) Prior Publication Data

US 2011/0083274 A1 Apr. 14, 2011

Related U.S. Application Data

(62) Division of application No. 11/740,572, filed on Apr. 26, 2007, now Pat. No. 7,865,983.

(51) Int. Cl.
*A61G 7/00* (2006.01)
*B62D 51/04* (2006.01)

(52) U.S. Cl. ........ 5/510; 5/662; 5/658; 5/600; 180/19.3; 180/11

(58) Field of Classification Search .............. 5/600, 624, 5/662, 510, 424, 429; 108/49; 180/11, 19.1–19.3
See application file for complete search history.

(56) References Cited

U.S. PATENT DOCUMENTS

| | | | |
|---|---|---|---|
| 383,815 | A | 5/1888 | Kilborn |
| 813,213 | A | 2/1906 | Johnson |
| 1,110,838 | A | 9/1914 | Taylor |
| 1,118,931 | A | 12/1914 | Hasley |
| 1,290,809 | A | 1/1919 | Truax |
| 1,490,650 | A | 4/1924 | Wagner |
| 1,598,124 | A | 8/1926 | Evans |
| 1,639,801 | A | 8/1927 | Heise |
| 1,778,698 | A | 10/1930 | Walter |
| 1,919,114 | A | 7/1933 | Ley |
| 2,224,087 | A | 12/1940 | Reichert |
| 2,470,524 | A | 5/1949 | Scudder |
| 2,497,425 | A | 2/1950 | Terry |
| 2,599,717 | A | 6/1952 | Menzies |
| 2,635,899 | A | 4/1953 | Osbon, Jr. |
| 2,673,771 | A | 3/1954 | Krewson |
| 2,696,963 | A | 12/1954 | Sheperd |

(Continued)

FOREIGN PATENT DOCUMENTS

| | | |
|---|---|---|
| CA | 2010543 | 9/1990 |

(Continued)

OTHER PUBLICATIONS

Pump Star User's Manual, The Headwall Company, Modular Services Company, Dec. 22, 2005, 11 pages.

(Continued)

*Primary Examiner* — Michael Trettel
(74) *Attorney, Agent, or Firm* — Barnes & Thornburg LLP

(57) ABSTRACT

A patient support apparatus, such as a hospital bed, comprises a lower frame, an upper frame supported above the lower frame and configured to support a patient, and a support structure coupled to the lower frame. The support structure includes a lift having a movable portion that is movable generally vertically relative to the lower frame and relative to the upper frame. The movable portion of the lift is configured to carry a patient care equipment support.

17 Claims, 20 Drawing Sheets

U.S. PATENT DOCUMENTS 2,981,959 A 5/1961 Burnham
2,999,555 A 9/1961 Stroud et al.
3,004,743 A 10/1961 Wenger
3,004,768 A 10/1961 Klages
3,112,001 A 11/1963 Wise
3,213,877 A 10/1965 May et al.
3,304,116 A 2/1967 Stryker
3,305,876 A 2/1967 Hutt
3,380,546 A 4/1968 Rabjohn
3,393,004 A 7/1968 Williams
3,404,746 A 10/1968 Slay
3,431,937 A 3/1969 Hettlinger et al.
3,452,371 A 7/1969 Hirsch
3,544,127 A 12/1970 Dobson
3,552,577 A 1/1971 Latham, Jr.
3,618,966 A 11/1971 Vandervest
3,674,294 A 7/1972 Kirkham
3,680,880 A 8/1972 Blaauw
3,709,556 A 1/1973 Allard et al.
3,770,070 A 11/1973 Smith
3,802,524 A 4/1974 Seidel
3,814,023 A 6/1974 Stantial
3,814,199 A 6/1974 Jones
3,820,838 A 6/1974 Limpach
3,869,011 A 3/1975 Jensen
3,872,945 A 3/1975 Hickman et al.
3,876,024 A * 4/1975 Shieman et al. ............. 180/19.1
3,938,608 A 2/1976 Folco-Zambelli
4,005,844 A 2/1977 Richmond
4,094,484 A 6/1978 Galione
4,113,222 A 9/1978 Frinzel
4,137,984 A 2/1979 Jennings et al.
4,164,355 A 8/1979 Eaton et al.
4,167,221 A 9/1979 Edmonson et al.
4,175,632 A 11/1979 Lassanske
4,175,783 A 11/1979 Pioth
4,190,224 A 2/1980 LeBlanc et al.
4,221,273 A 9/1980 Finden
4,225,104 A 9/1980 Larson
4,262,874 A 4/1981 Seigh
4,274,503 A 6/1981 Mackintosh
4,275,797 A 6/1981 Johnson
D260,816 S 9/1981 Zissimopoulos et al.
4,339,104 A 7/1982 Weidman
4,378,014 A 3/1983 Elkow
4,415,049 A 11/1983 Wereb
4,415,050 A 11/1983 Nishida et al.
4,439,879 A 4/1984 Werner
4,444,284 A 4/1984 Montemurro
4,475,611 A 10/1984 Fisher
4,475,613 A 10/1984 Walker
4,489,454 A 12/1984 Thompson
4,511,157 A 4/1985 Wilt, Jr.
4,511,158 A 4/1985 Varga et al.
4,511,825 A 4/1985 Klimo
4,513,832 A 4/1985 Engman
4,559,036 A 12/1985 Wunsch
4,566,707 A 1/1986 Nitzberg
4,584,989 A 4/1986 Stith
4,600,209 A 7/1986 Kerr, Jr.
4,614,246 A 9/1986 Masse et al.
4,616,797 A 10/1986 Cramer
4,629,242 A 12/1986 Schrager
4,646,860 A 3/1987 Owens et al.
D289,604 S 5/1987 Gallant et al.
4,691,397 A 9/1987 Netzer
4,718,892 A 1/1988 Yung-Ho
4,723,808 A 2/1988 Hines
4,724,555 A 2/1988 Poehner et al.
4,725,027 A 2/1988 Bekanich
4,729,576 A 3/1988 Roach
4,738,369 A 4/1988 Desjardins
4,744,536 A 5/1988 Bancalari
4,756,706 A 7/1988 Kerns et al.
4,759,418 A 7/1988 Goldenfeld et al.
4,771,840 A 9/1988 Keller
4,795,122 A 1/1989 Petre
4,807,716 A 2/1989 Hawkins
4,811,988 A 3/1989 Immel
4,848,504 A 7/1989 Olson
4,874,055 A 10/1989 Beer
4,879,798 A 11/1989 Petre
4,892,279 A 1/1990 Lafferty et al.
4,895,040 A 1/1990 Soederberg
4,901,967 A 2/1990 Petre
4,905,882 A 3/1990 Ross
4,905,944 A 3/1990 Jost et al.
4,922,574 A 5/1990 Heiligenthal et al.
4,925,444 A 5/1990 Orkin et al.
4,938,493 A 7/1990 Okuda
4,945,592 A 8/1990 Sims et al.
4,949,408 A 8/1990 Trkla
4,966,340 A 10/1990 Hunter
4,969,768 A 11/1990 Young
4,979,582 A 12/1990 Forster
4,981,309 A 1/1991 Froeschle et al.
4,997,150 A 3/1991 Mardollo
5,016,307 A 5/1991 Rebar
5,026,017 A 6/1991 Kreuzer
5,060,327 A 10/1991 Celestina et al.
5,060,959 A 10/1991 Davis et al.
5,069,465 A 12/1991 Stryker et al.
5,078,349 A 1/1992 Smith
5,083,625 A 1/1992 Bleicher
5,083,807 A 1/1992 Bobb et al.
5,084,922 A 2/1992 Louit
5,094,314 A 3/1992 Hayata
5,094,418 A 3/1992 McBarnes, Jr. et al.
5,107,636 A 4/1992 Schindele et al.
5,108,064 A 4/1992 Kreuzer
5,110,076 A 5/1992 Snyder et al.
5,112,019 A 5/1992 Metzler et al.
5,113,897 A 5/1992 Kummerfeld et al.
5,117,521 A 6/1992 Foster et al.
5,121,806 A 6/1992 Johnson
5,125,607 A 6/1992 Pryor
5,135,191 A 8/1992 Schmuhl
5,149,036 A 9/1992 Sheehan
5,156,226 A 10/1992 Boyer et al.
5,181,762 A 1/1993 Beumer
5,187,824 A 2/1993 Stryker
5,193,633 A 3/1993 Ezenwa
5,201,819 A 4/1993 Shiraishi et al.
5,207,642 A 5/1993 Orkin et al.
5,219,139 A 6/1993 Hertzler et al.
5,222,567 A 6/1993 Broadhead et al.
5,224,681 A 7/1993 Lundstrom
5,232,065 A 8/1993 Cotton
5,244,225 A 9/1993 Frycek
5,251,429 A 10/1993 Minato et al.
5,255,403 A 10/1993 Ortiz
5,279,010 A 1/1994 Ferrand et al.
5,284,218 A 2/1994 Rusher, Jr.
5,293,950 A 3/1994 Marliac
5,306,109 A 4/1994 Kreuzer et al.
5,307,889 A 5/1994 Bohannan
5,319,816 A 6/1994 Ruehl
5,322,306 A 6/1994 Coleman
5,326,059 A 7/1994 Pryor et al.
5,337,845 A 8/1994 Foster et al.
5,337,992 A 8/1994 Pryor et al.
5,344,169 A 9/1994 Pryor et al.
5,348,326 A 9/1994 Fullenkamp et al.
5,358,265 A 10/1994 Yaple
5,366,036 A 11/1994 Perry
5,366,191 A 11/1994 Bekanich
5,381,572 A 1/1995 Park
5,388,294 A 2/1995 Reeder
5,396,673 A * 3/1995 Foster ............................... 5/600
5,400,995 A 3/1995 Boyd
5,406,778 A 4/1995 Lamb et al.
5,407,163 A 4/1995 Kramer et al.
5,421,548 A 6/1995 Bennett et al.
5,439,069 A 8/1995 Beeler
5,445,233 A 8/1995 Fernie et al.
5,447,317 A 9/1995 Gehlsen et al.
5,447,935 A 9/1995 Hubele et al.

5,450,639 A 9/1995 Weismiller et al.
5,456,655 A 10/1995 Morris
5,477,935 A 12/1995 Chen
5,479,958 A 1/1996 Kummerfeld
5,480,212 A * 1/1996 Marconet ................ 297/188.01
5,495,904 A 3/1996 Zwaan et al.
5,526,890 A 6/1996 Kadowaki
5,527,125 A 6/1996 Kreuzer et al.
5,531,030 A 7/1996 Dale, Jr.
5,535,465 A 7/1996 Hannant
5,542,690 A 8/1996 Kozicki
5,556,065 A 9/1996 Wadley
5,562,091 A 10/1996 Foster et al.
5,570,483 A 11/1996 Williamson
5,580,207 A * 12/1996 Kiebooms et al. ............ 414/495
5,588,166 A 12/1996 Burnett
5,613,252 A 3/1997 Yu et al.
5,618,090 A 4/1997 Montague et al.
5,636,823 A 6/1997 Boyd
5,644,876 A 7/1997 Walker
5,647,491 A 7/1997 Foster et al.
5,657,884 A 8/1997 Zilincar, III
5,669,086 A 9/1997 Garman
5,687,437 A 11/1997 Goldsmith
5,690,185 A 11/1997 Sengel
5,697,623 A 12/1997 Bermes et al.
5,699,988 A 12/1997 Boettger et al.
5,704,577 A 1/1998 Gordon
5,711,521 A 1/1998 Reist
5,737,782 A 4/1998 Matsuura et al.
5,749,424 A 5/1998 Reimers
5,775,456 A 7/1998 Reppas
5,778,996 A 7/1998 Prior et al.
5,806,111 A 9/1998 Heimbrock et al.
5,809,755 A 9/1998 Velke et al.
5,826,670 A 10/1998 Nan
5,839,528 A 11/1998 Lee
5,857,685 A 1/1999 Phillips et al.
5,876,016 A 3/1999 Urban et al.
5,878,536 A 3/1999 Demmitt et al.
5,898,961 A 5/1999 Ambach et al.
5,906,017 A 5/1999 Ferrand et al.
5,915,487 A 6/1999 Splittstoesser et al.
5,921,338 A 7/1999 Edmondson
5,924,658 A 7/1999 Shiery et al.
5,927,414 A 7/1999 Kan et al.
5,934,694 A 8/1999 Schugt et al.
5,937,959 A 8/1999 Fujii et al.
5,937,961 A 8/1999 Davidson
5,944,131 A 8/1999 Schaffner et al.
5,964,313 A 10/1999 Guy
5,964,473 A 10/1999 Degonda et al.
5,966,760 A 10/1999 Gallant et al.
5,971,091 A 10/1999 Kamen et al.
5,983,425 A 11/1999 DiMucci et al.
5,987,670 A 11/1999 Sims et al.
5,987,671 A 11/1999 Heimbrock et al.
5,988,304 A 11/1999 Behrendts
5,996,149 A 12/1999 Heimbrock et al.
6,000,486 A 12/1999 Romick et al.
6,016,580 A 1/2000 Heimbrock et al.
6,035,561 A 3/2000 Paytas et al.
6,050,356 A 4/2000 Takeda et al.
6,056,249 A 5/2000 Fillon, Jr.
6,059,060 A 5/2000 Kanno et al.
6,059,301 A 5/2000 Skarnulis
6,062,328 A 5/2000 Campbell et al.
6,065,555 A 5/2000 Yuki et al.
6,070,679 A 6/2000 Berg et al.
6,073,285 A 6/2000 Ambach et al.
6,076,209 A 6/2000 Paul
6,095,468 A 8/2000 Chirico et al.
6,098,732 A 8/2000 Romick et al.
6,105,348 A 8/2000 Turk et al.
6,109,572 A 8/2000 Urban et al.
6,125,957 A 10/2000 Kauffmann
6,131,690 A 10/2000 Galando et al.
6,148,942 A 11/2000 Mackert, Sr.
6,154,690 A 11/2000 Coleman
6,155,743 A 12/2000 Chen
6,170,102 B1 1/2001 Kreuzer
6,173,799 B1 1/2001 Miyazaki et al.
6,178,575 B1 1/2001 Harada
6,179,074 B1 1/2001 Scharf
6,179,260 B1 1/2001 Ohamian
6,182,662 B1 2/2001 McGhee
6,201,983 B1 3/2001 Haumann et al.
6,209,670 B1 4/2001 Fernie et al.
6,212,714 B1 * 4/2001 Allen et al. ........................ 5/624
6,213,481 B1 4/2001 Marchese et al.
6,231,016 B1 5/2001 Slone
6,256,812 B1 7/2001 Bartow et al.
6,286,165 B1 9/2001 Heimbrock et al.
6,330,926 B1 12/2001 Heimbrock et al.
6,343,665 B1 2/2002 Eberlein et al.
6,349,436 B1 2/2002 Kreuzer
6,375,133 B1 4/2002 Morrow
6,390,213 B1 5/2002 Bleicher
6,390,311 B1 5/2002 Belokin
6,434,329 B1 8/2002 Dube et al.
6,474,434 B1 11/2002 Bech
6,505,359 B2 1/2003 Heimbrock et al.
6,585,206 B2 7/2003 Metz et al.
6,601,860 B2 8/2003 Potter
6,619,599 B2 9/2003 Elliott et al.
6,668,402 B2 12/2003 Heimbrock
6,668,493 B1 12/2003 Walker
6,668,965 B2 12/2003 Strong
6,708,991 B1 3/2004 Ortlieb
6,725,483 B2 * 4/2004 Gallant et al. .................... 5/658
6,725,956 B1 4/2004 Lemire
6,729,421 B1 * 5/2004 Gluck et al. .................... 180/11
6,749,034 B2 6/2004 Vogel et al.
6,752,224 B2 6/2004 Hopper et al.
6,772,850 B1 8/2004 Waters et al.
6,877,572 B2 4/2005 Vogel et al.
6,945,697 B2 9/2005 Schuster
6,966,086 B2 11/2005 Metz et al.
7,011,172 B2 3/2006 Heimbrock et al.
7,014,000 B2 3/2006 Kummer et al.
7,018,157 B2 * 3/2006 Gallant et al. ................ 414/495
7,040,057 B2 5/2006 Gallant et al.
7,065,811 B2 6/2006 Newkirk et al.
7,065,812 B2 6/2006 Newkirk et al.
7,083,012 B2 8/2006 Vogel et al.
7,090,041 B2 8/2006 Vogel et al.
7,171,708 B2 * 2/2007 Osborne et al. ................... 5/618
7,195,253 B2 3/2007 Vogel et al.
7,273,115 B2 9/2007 Kummer et al.
7,284,626 B2 10/2007 Heimbrock et al.
7,419,019 B1 9/2008 White et al.
7,481,286 B2 * 1/2009 Ruschke et al. ................ 180/11
7,594,284 B2 * 9/2009 Schuchardt ...................... 5/86.1
7,865,983 B2 1/2011 Newkirk et al.
7,884,735 B2 * 2/2011 Newkirk .................... 340/691.6
7,886,377 B2 2/2011 Hamberg et al.
2002/0138905 A1 10/2002 Bartlett et al.
2002/0152555 A1 10/2002 Gallant et al.
2003/0102172 A1 6/2003 Kummer et al.
2004/0133982 A1 7/2004 Horitani et al.
2005/0199430 A1 9/2005 Vogel et al.
2006/0059623 A1 3/2006 Karmer, Jr. et al.
2006/0207026 A1 9/2006 Newkirk et al.
2008/0141459 A1 6/2008 Hamberg et al.
2008/0263769 A1 10/2008 Newkirk et al.

FOREIGN PATENT DOCUMENTS

CA 2294761 1/1999
CA 2589811 6/2006
DE 1 041 210 10/1958
DE 92 04 3216 7/1992
DE 42 42 507 6/1994
DE 94 20 429 12/1994
DE 295 18 502 1/1997
DE 199 21 503 4/2000
EP 0 062 180 10/1982
EP 0 093 700 11/1983
EP 0 204 637 12/1986

| | | |
|---|---|---|
| EP | 0 329 504 | 8/1989 |
| EP | 0 352 647 | 1/1990 |
| EP | 0 403 202 | 12/1990 |
| EP | 0 420 263 | 4/1991 |
| EP | 0 630 637 | 12/1994 |
| EP | 0 653 341 | 5/1995 |
| EP | 0 776 637 | 6/1997 |
| EP | 0 776 648 | 6/1997 |
| EP | 943306 | 3/1999 |
| EP | 991529 | 4/2000 |
| EP | 1243900 | 3/2002 |
| EP | 1 911 429 | 4/2008 |
| FR | 2 714 008 | 6/1995 |
| FR | 2 735 019 | 12/1996 |
| FR | 2 746 060 | 9/1997 |
| GB | 415450 | 8/1934 |
| GB | 672557 | 5/1952 |
| GB | 1061383 | 3/1967 |
| GB | 1 601 930 | 11/1981 |
| GB | 2 285 393 | 7/1995 |
| JP | 46-31490 | 9/1971 |
| JP | 47-814 | 8/1972 |
| JP | 47-17495 | 10/1972 |
| JP | 47-44792 | 6/1973 |
| JP | 48-44792 | 6/1973 |
| JP | 48-44793 | 6/1973 |
| JP | 48-54494 | 7/1973 |
| JP | 48-54495 | 7/1973 |
| JP | 49-29855 | 3/1974 |
| JP | 51-20491 | 2/1976 |
| JP | 53-9091 | 1/1978 |
| JP | 53-96397 | 8/1978 |
| JP | 56-68523 | 6/1981 |
| JP | 56-68524 | 6/1981 |
| JP | 56-73822 | 6/1981 |
| JP | 57-157325 | 10/1982 |
| JP | 57-187521 | 11/1982 |
| JP | 58 06357 | 4/1983 |
| JP | 59-37946 | 3/1984 |
| JP | 59-38176 | 3/1984 |
| JP | 59-183756 | 10/1984 |
| JP | 59-186554 | 10/1984 |
| JP | 60-12058 | 1/1985 |
| JP | 60-12059 | 1/1985 |
| JP | 60-21751 | 2/1985 |
| JP | 60-31749 | 2/1985 |
| JP | 60-31750 | 2/1985 |
| JP | 60-31751 | 2/1985 |
| JP | 60-122561 | 7/1985 |
| JP | 60-188152 | 9/1985 |
| JP | 60-188153 | 9/1985 |
| JP | 61 88727 | 8/1986 |
| JP | 61-188727 | 11/1986 |
| JP | 62-60433 | 4/1987 |
| JP | 64-17231 | 1/1989 |
| JP | 2-84961 | 3/1990 |
| JP | 3-31063 | 2/1991 |
| JP | 4-108525 | 9/1992 |
| JP | 6-50631 | 7/1994 |
| JP | 6-237959 | 8/1994 |
| JP | 7-136215 | 5/1995 |
| JP | 7 328074 | 12/1995 |
| JP | 8-112244 | 5/1996 |
| JP | 8-317953 | 12/1996 |
| JP | 9-24071 | 1/1997 |
| JP | 9-38154 | 2/1997 |
| JP | 9-38155 | 2/1997 |
| JP | 10-146364 | 6/1998 |
| JP | 10-181609 | 7/1998 |
| JP | 10-305705 | 11/1998 |
| JP | 200-118407 | 4/2000 |
| JP | 2000-107230 | 4/2000 |
| JP | 2000-175974 | 6/2000 |
| WO | WO 82-01313 | 4/1982 |
| WO | WO 87/07830 | 12/1987 |
| WO | WO 89/02235 | 3/1989 |
| WO | WO 94/16935 | 8/1994 |
| WO | WO 94/21505 | 9/1994 |
| WO | WO 95/20514 | 8/1995 |
| WO | WO 96/07555 | 3/1996 |
| WO | WO 96/33900 | 10/1996 |
| WO | WO 97/39715 | 10/1997 |
| WO | WO 99/01298 | 1/1999 |
| WO | WO 00/09061 | 2/2000 |
| WO | WO 00/37222 | 6/2000 |
| WO | WO 00/51830 | 8/2000 |
| WO | WO 01/19313 | 3/2001 |
| WO | WO 01/85084 | 11/2001 |
| WO | WO 2004/112675 | 12/2004 |
| WO | WO 2005/028243 | 3/2005 |
| WO | WO 2005/068276 | 7/2005 |
| WO | WO 2006/059200 | 6/2006 |
| WO | WO 2007/121376 | 10/2007 |

OTHER PUBLICATIONS

"Modular Plus Star", The Headwall Company, Modular Services Company, 2005, 4 pages.
Partial European Search Report dated Jun. 23, 2009 from related EP 08 25 1065.
Stryker Medical, 2040 Zoom.RTM. Critical Care Bed Maintenance Manual, date unknown.
Motorvator 3 Product Features Webpage, May 10, 2000.
Stryker Corporation Zoom.RTM. drive brochure, Mar. 2000.
Midmark 530 Stretcher Information, Midmark Catalog, p. 14.
Tri-Flex II by Burke, Inc., "Operation Manual Impulse Drive System," (2004).
European Search Report dated Sep. 26, 2008, on European Application EP07254040.
European search report dated Mar. 19, 2010 from EP 09 25 0210.

* cited by examiner

PATIENT SUPPORT APPARATUS WITH MOTORIZED TRACTION CONTROL

CROSS-REFERENCE TO RELATED APPLICATIONS

This application is a divisional of U.S. application Ser. No. 11/740,572, filed Apr. 26, 2007, which issued as U.S. Pat. No. 7,865,983 and which is hereby incorporated by reference herein.

FIELD OF THE INVENTION

The present disclosure relates to a patient care equipment support, and more particularly relates to a system for transferring a patient care equipment support between two or more devices, such as a hospital bed, a wall arm system, a wheeled cart, stand or dolly, and the like.

BACKGROUND OF THE INVENTION

Hospitalized patients often require patient care equipment to be in close proximity during hospital care. Such patient care equipment is typically supported on a patient care equipment support such as, a rack, shelf system, cabinet, an IV pole or the like. Examples of patient care equipment include, but are not limited to, the following: heart monitoring equipment, medical gas delivery equipment, infusion management equipment, equipment monitors, patient monitors, defibrillators, IV bags, IV pumps, IV poles, oxygen tanks, suction equipment, and the like, many of which directly connect to the patient via lines or tubes.

It is desirable that patient care equipment is transferable between a patient support apparatus, such as a hospital bed, a stretcher, an ambulatory care chair, and the like, and a support structure, such as a ceiling or wall-mounted service head, a ceiling or wall-mounted equipment support arm, a floor-supported stand, a wheeled cart, a headwall, a wall of a hospital room, and the like. An illustrative patient care equipment support that is transferable between a patient support apparatus, such as a hospital bed, and a support structure, such as a service head, is disclosed in a U.S. Patent Application, Publication Number US-2006-0179571-A1, which application is hereby incorporated by reference herein.

SUMMARY OF THE INVENTION

The present invention comprises an apparatus, or a system or a method having one or more of the features recited in the claims or one or more of the following features, which alone or in any combination may comprise patentable subject matter:

A patient support apparatus may comprise a lower frame supported on a floor, an upper frame supported above the lower frame and configured to support a patient, and a support structure coupled to the lower frame. The support structure may include a column or lift having a movable portion that is movable generally vertically relative to the lower frame and relative to the upper frame. The movable portion of the lift may be configured to carry a patient care equipment support. The equipment support may be configured to support patient care equipment. The upward movement of the movable portion of the lift may allow the equipment support to be lifted off the floor and the downward movement of the movable portion of the lift may allow the equipment support to be lowered onto the floor. The patient support apparatus may be one of a hospital bed, stretcher, OR table, or the like. The equipment support may be one of a rack, shelf system, cabinet, an IV pole, a cart, or the like.

The apparatus may further comprise an actuator operable to raise and lower the movable portion of the lift and a user input coupled to the actuator. The user input may be located on the movable portion of the lift. The apparatus may further comprise a handle coupled to the movable portion of the lift. The handle may be movable between a use position and a storage position.

The support structure may comprise an arm extending outwardly from the lower frame so that at least a portion of the arm extends outside a footprint of the upper frame. The lift may extend upwardly from the portion of the arm that extends outside the footprint of the upper frame. The arm may be coupled to the lower frame for side-to-side movement between a first position on a first side of the lower frame and a second position on a second side of the lower frame through a central position near a head end of the lower frame. The arm may comprise a first portion coupled to the lower frame for pivoting movement about a generally vertical axis and a second portion that is movable relative to the first portion along a longitudinal axis of the arm. The movable second portion of the arm may carry the lift. The longitudinal axis of the arm may be generally horizontal.

The apparatus may further comprise a linkage coupled to the lower frame and coupled to the movable second portion of the arm that carries the lift. Pivoting movement of the first portion of the arm may cause the linkage to move the second portion of the arm carrying the lift along the longitudinal axis of the arm. The linkage may comprise a frame member coupled to the lower frame and having a track and a pin coupled to the movable second portion of the arm and riding in the track.

The arm may pivot from the central position near the head end of the lower frame to the first position on the first side of the lower frame through an intermediate position near a corner of the lower frame. The second portion of the arm carrying the lift may move generally outwardly as the arm pivots from the central position near the head end of the lower frame to the intermediate position near the corner of the lower frame. The second portion of the arm carrying the lift may move generally inwardly as the arm pivots from the intermediate position near the corner of the lower frame to the first position near the first side of the lower frame.

The apparatus may further comprise a first actuator operable to raise and lower the movable portion of the lift, a first user input coupled to the first actuator, a second actuator operable to pivot the arm about the generally vertical axis, a second user input coupled to the second actuator, a third actuator operable to move the second portion of the arm along the longitudinal axis of the arm and a third user input coupled to the third actuator. The first, second and third user inputs may be located on the movable portion of the lift. The movable portion of the lift may have upper and lower first couplers which are vertically aligned. The patient care equipment support may comprise upper and lower second couplers which are also vertically aligned and which are configured to be detachably coupled to the respective upper and lower first couplers of the patient support apparatus when the equipment support is carried by the patient support apparatus.

When the upper and lower first couplers of the patient support apparatus are positioned vertically below the respective upper and lower second couplers of the equipment support and the movable portion of the lift is raised, the upper and lower first couplers engage the upper and lower second couplers to lift the equipment support off the floor, allowing the equipment support to be transported with the patient support apparatus. The equipment support may be decoupled from the patient support apparatus when the movable portion of the lift is lowered to a position where the equipment support is supported on the floor and the upper and lower first couplers of the patient support apparatus are disengaged from the respective upper and lower second couplers of the equipment support, allowing the equipment support to move away from the patient support apparatus.

In some embodiments, the upper and lower first couplers may comprise upper and lower upwardly-opening hooks and the upper and lower second couplers may comprise upper and lower horizontally-extending members. In other embodiments, the upper and lower first couplers may comprise upper and lower horizontally-extending pins and the upper and lower second couplers may comprise upper and lower downwardly-opening hooks. In still other embodiments, the upper and lower first couplers may comprise upper and lower upwardly-opening sockets or collars and the upper and lower second couplers may comprise downwardly-extending pins. In further embodiments, the upper and lower first couplers may comprise upper and lower upwardly-extending pins and the upper and lower second couplers comprise upper and lower downwardly-opening sockets or collars.

The system may further comprise a device, such as a support arm, column, or wheeled stand or cart, having a first portion and a second portion that is movable vertically relative to the first portion. The movable second portion of the device may have upper and lower third couplers which are vertically aligned. When the upper and lower third couplers of the device are positioned vertically below the respective upper and lower second couplers of the equipment support and the movable second portion of the device is raised, the upper and lower third couplers engage the respective upper and lower second couplers to lift the equipment support off the floor. The equipment support may be decoupled from the device when the movable second portion of the device is lowered to a position where the equipment support is supported on the floor and the upper and lower third couplers of the device are disengaged from the respective upper and lower second couplers of the equipment support, allowing the equipment support to move away from the device.

In some embodiments, the equipment support may have upper and lower fourth couplers which are also vertically aligned and which are configured to be coupled to the respective upper and lower third couplers of the device when the equipment support is detachably coupled to the device. The equipment support may be transferred directly from the patient support apparatus to the device when the upper and lower third couplers of the device are positioned vertically below the respective upper and lower fourth couplers of the equipment support and the movable second portion of the device is raised to a position where the upper and lower third couplers of the device engage the respective upper and lower fourth couplers of the equipment support and the equipment support is lifted off the patient support apparatus. Further upward movement of the movable second portion of the device causes the upper and lower second couplers of the equipment support to disengage from the respective upper and lower first couplers of the patient support apparatus, allowing the equipment support to move away from the patient support apparatus.

Alternatively, the equipment support may be transferred directly from the patient support apparatus to the device when the upper and lower third couplers of the device are positioned vertically below the respective upper and lower fourth couplers of the equipment support and the movable portion of the lift is lowered to a position where the upper and lower third couplers of the device engage the respective upper and lower fourth couplers of the equipment support and the equipment support is lifted off the patient support apparatus. Further downward movement of the movable portion of the lift causes the upper and lower second couplers of the equipment support to disengage from the respective upper and lower first couplers of the patient support apparatus, allowing the equipment support to move away from the patient support apparatus.

In some embodiments, the device may comprise a wall arm system having a lift and the upper and lower third couplers may be coupled to the lift. In some other embodiments, the device may comprise a stand or cart having a wheeled base, a column extending generally vertically upwardly from the base and a lift coupled to the column. The upper and lower third couplers may be coupled to the lift coupled to the column.

The apparatus may include a motorized traction system coupled to the lower frame and operable to propel the patient support apparatus along a floor. The motorized traction system may have a user input coupled to the handle. The user input may comprise a force sensor, such as a load cell, coupled to the handle. The apparatus may comprise a first sensor configured to enable the motorized traction system when the arm is generally centered at the head end of the lower frame and configured to disable the motorized traction system when the arm is generally not centered at the head end of the lower frame. The apparatus may comprise a second sensor configured to enable the motorized traction system when the handle is in the use position and configured to disable the motorized traction system when the handle is in the storage position.

The apparatus may include a deck supported above the upper frame. The deck may include a foot section that extends and retracts. A user input for extending and retracting the foot section may be coupled to the movable portion of the column. The user input may include a foot section extension button to increase the length of the foot section and a foot section retraction button to decrease the length of the foot section.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures, in which.

DESCRIPTION OF THE ILLUSTRATIVE EMBODIMENTS

Figure 1:
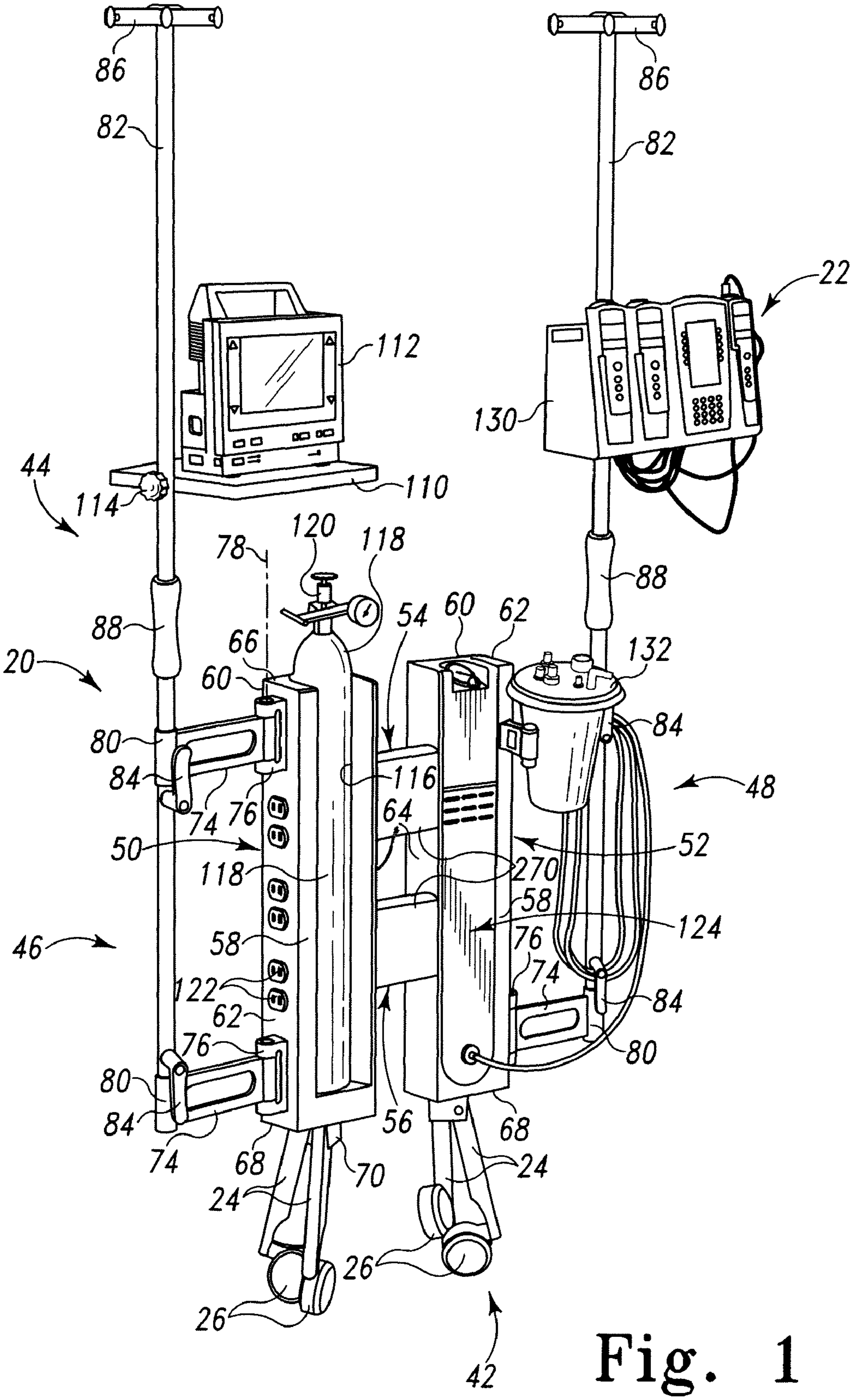
FIG. 1 is a perspective view of a transferable patient care equipment support showing a first tower, a second tower positioned alongside the first tower, a pair of upper and lower vertically-aligned couplers extending between the towers, each tower having a pair of downwardly-extending support legs with floor engaging wheels, the support legs being shown in collapsed positions, each tower having a pair of pivotally-mounted arms that extend horizontally outwardly from the associated tower and carry an IV pole, the IV pole coupled to the first tower carrying a monitor supported on a shelf, the IV pole coupled to the second tower carrying a plurality of IV pumps, the first tower carrying an oxygen cylinder and having a plurality of electrical outlets, and the second tower carrying a battery pack and suction equipment.
Figure 2:
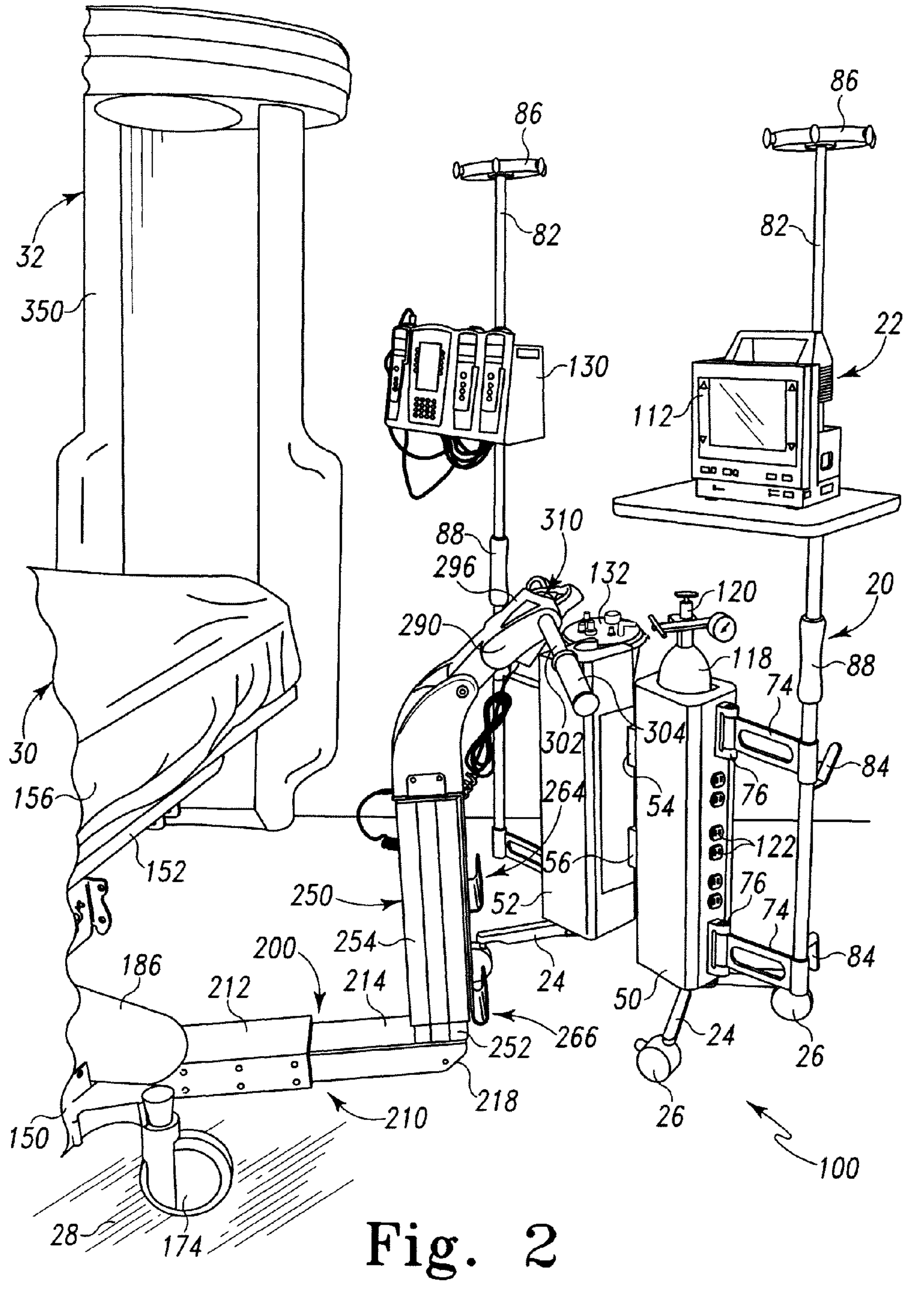
FIG. 2 is a perspective view of an illustrative equipment support transfer system, with portions broken away, comprising a wall arm system, a hospital bed, and the equipment support of FIG. 1, showing the wall arm system having a support structure extending upwardly from the floor, the hospital bed having its head end positioned near the upwardly-extending support structure of the wall arm system, and the equipment support supported on the floor-engaging wheels, and further showing the hospital bed having a lower frame, an upper frame supported above the lower frame, a telescoping arm having an outer tube and an inner tube that telescopes horizontally into and out of the outer tube, the outer tube being coupled to the lower frame for side-to-side movement, a telescoping column or lift extending upwardly from a terminal portion of the inner tube, the column having upper and lower couplers which are vertically aligned, and a pair of push handles extending horizontally outwardly from an upper portion of the column.

FIG. 1 shows an illustrative equipment support 20 that is configured to support patient care equipment 22. The equipment support 20 has a plurality of downwardly-extending support legs 24 with floor-engaging wheels 26 which allow the equipment support 20 to be lowered onto a floor 28, as shown, for example, in FIG. 2, for stand-alone operation thereof to locate patient care equipment 22 in close proximity to a patient. When the equipment support 20 is supported on the floor 28, the equipment support 20 functions as a cart and can be rolled along the floor 28 from one location to another location along with the patient care equipment 22 carried by equipment the support 20.

Figure 3:
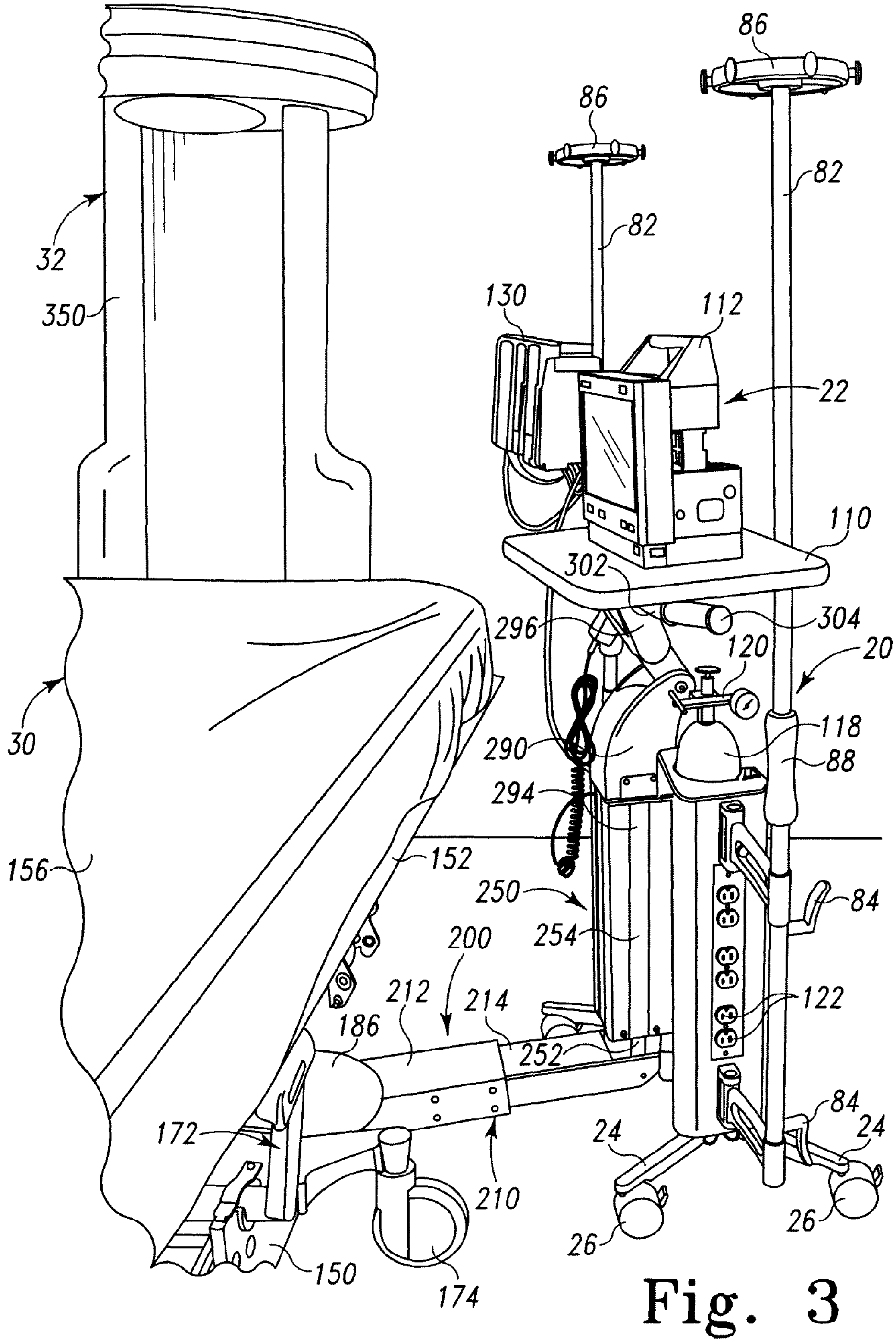
FIG. 3 is a perspective view, similar to FIG. 2, showing the equipment support moved closer to the bed where the upper and lower couplers of the bed are positioned generally vertically below the respective upper and lower couplers of the equipment support.
Figure 4:
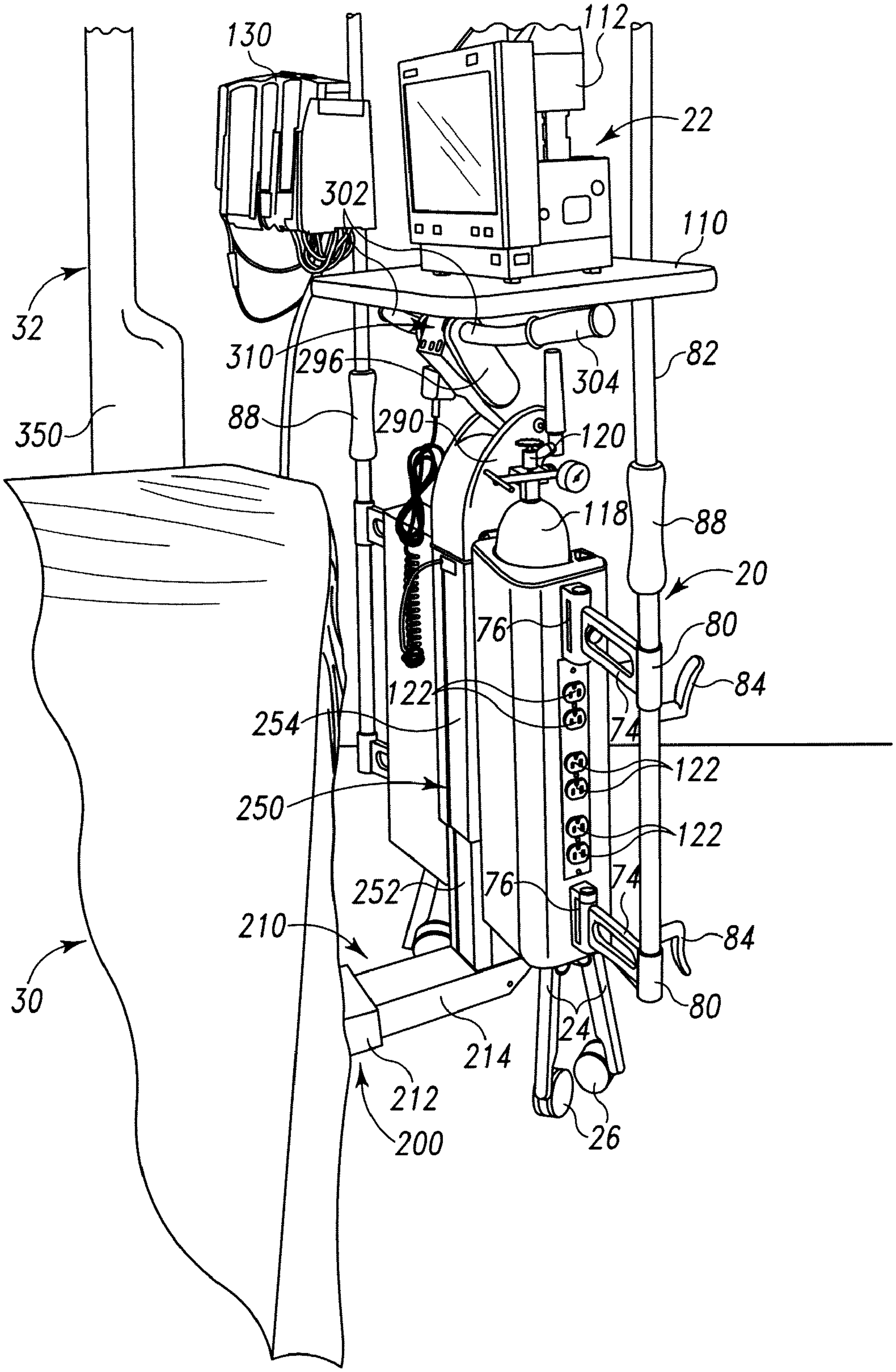
FIG. 4 is perspective views, similar to FIG. 3, showing the equipment support lifted off the floor by the telescoping column of the bed to a position where the support legs and the floor-engaging wheels of equipment support are spaced from the floor.
Figure 10:
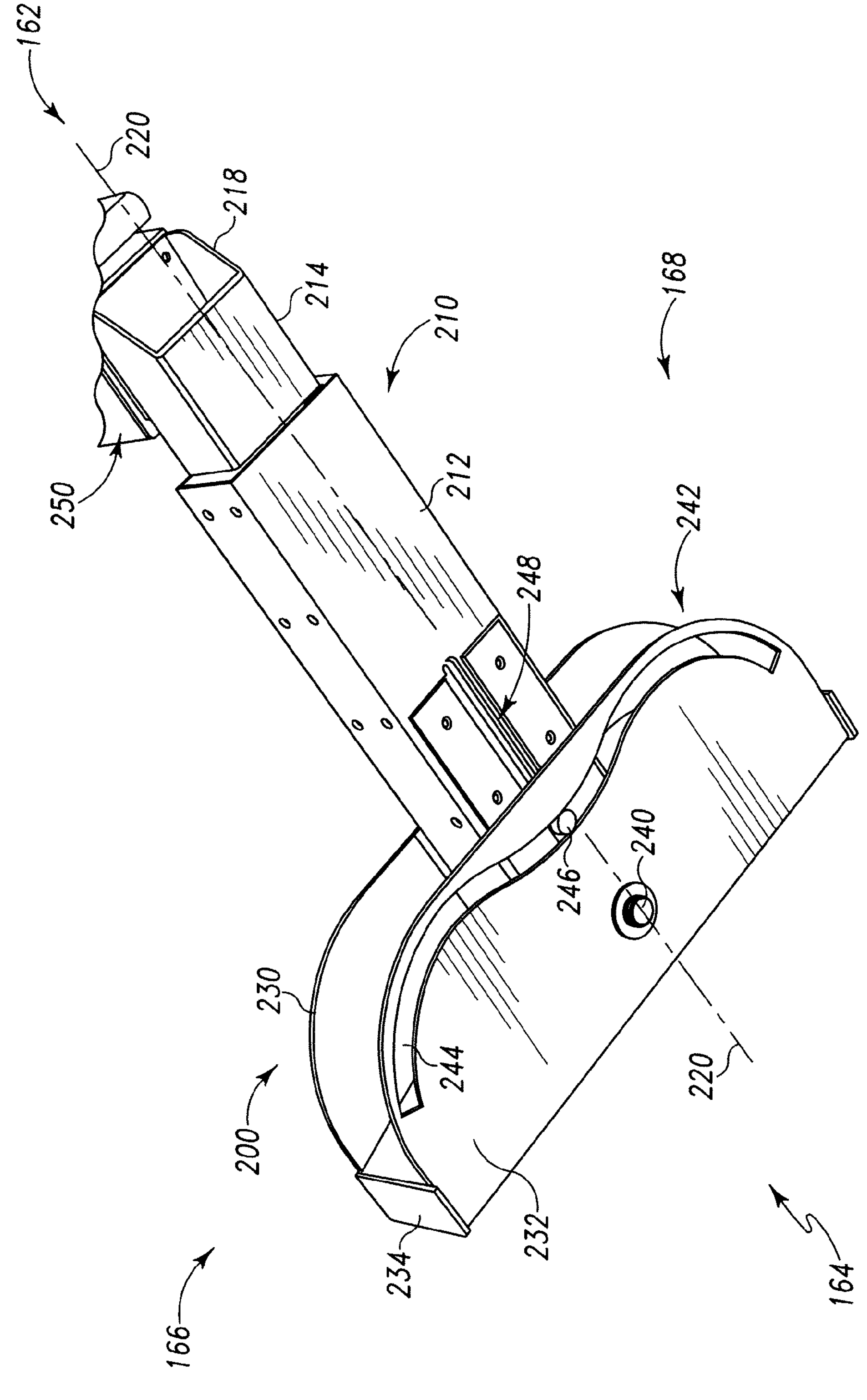
FIG. 10 is a bottom perspective view showing a pin coupled to the inner tube of the arm extending downwardly through an elongate slot in the outer tube of the arm and received in the guide track formed in the lower flange.
Figure 11:
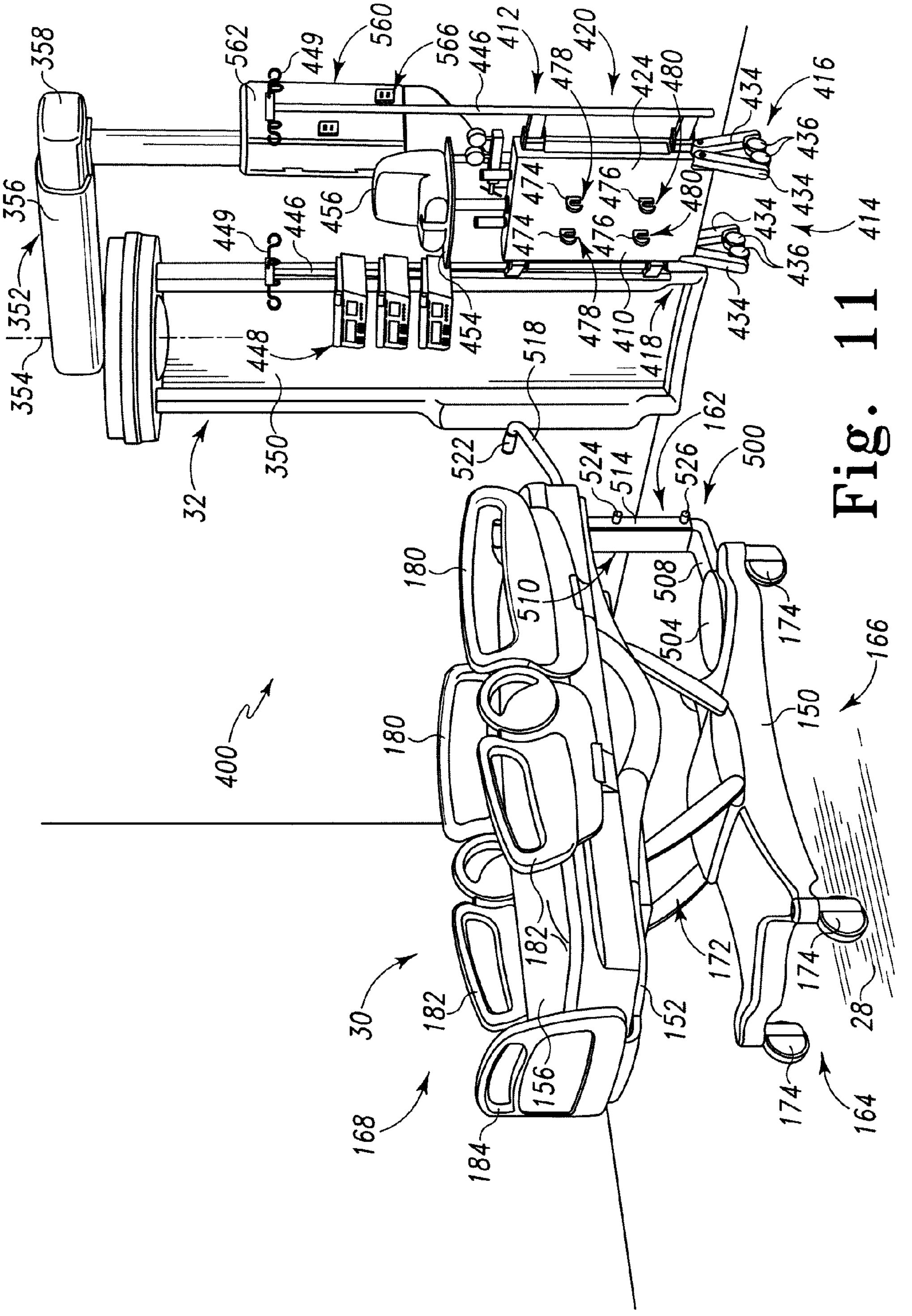
FIG. 11 is a perspective view of a second embodiment of the equipment support transfer system comprising a wall arm system, a hospital bed, and the equipment support, and showing the equipment support carried by the wall arm system and having a generally box-shaped tower carrying an oxygen tank, a battery pack, suction equipment and a shelf, a monitor supported on the shelf, a pair of support legs with floor engaging wheels extending downwardly from a left side of the tower, a pair of support legs with floor engaging wheels extending downwardly from a right side of the tower, a pair of pivotally-mounted arms that extend horizontally outwardly from a left side of the tower and carry an IV pole, and a pair of pivotally-mounted arms that extend horizontally outwardly from a right side of the tower and carry an IV pole that supports a plurality of IV pumps.

The equipment support 20 is transferable from a position where the equipment support 20 is supported on the floor 28 (FIG. 2) to a position where the equipment support 20 is lifted off the floor 28 by a wheeled patient support apparatus, such as a hospital bed 30 as shown, for example, in FIG. 4, or lifted off the floor 28 by a support structure, such as a wall arm system 32 as shown, for example, in FIG. 11 with respect to an equipment support 420. Conversely, the equipment support 20 is transferable from a position where the equipment support 20 is carried by the bed 30 or the wall arm system 32 to a position where the equipment support 20 is supported on the floor 28. When the equipment support 20 is carried by the bed 30, the equipment support 20, including the patient care equipment 22 supported thereon, can be transported with the bed 30 from one area to another. In some embodiments, an equipment support, such as the equipment support 420 shown in FIGS. 11-16, is directly transferable from the bed 30 to the wall arm system 32 and from the wall arm system 32 to the bed 30 without having to go through an intermediate step of lowering the equipment support 20 onto the floor 28. Illustratively, the equipment support 20, the bed 30 and the wall arm system 32 cooperate to form an illustrative patient care equipment support transfer system 100 shown in FIGS. 2-10.

In FIGS. 2-7, the patient support apparatus is illustratively the hospital bed 30 positioned in a patient room of a hospital or a healthcare facility. However, it should be understood that the patient support apparatus may very well be a stretcher, a surgical table, an ambulatory care chair, and the like. Also, in FIG. 2, the support structure is illustratively the wall arm system 32 located in the patient room of a hospital or a healthcare facility. However, it should be understood that the support structure may very well be some other type of device such as a floor-supported stand, a wheeled cart or dolly, a headwall, a wall of a hospital room, and the like. In addition, it should be understood that the support structure and the patient support apparatus may very well be used in different settings such as, for example, intensive care rooms, operating rooms, physician offices, and nursing homes.

As shown in FIG. 1, the equipment support 20 includes a first tower 50, a second tower 52 positioned alongside the first tower 50, and a pair of upper and lower vertically-aligned couplers 54, 56 extending between the towers 50, 52. Each tower 50, 52 is in the form of a rectangular, box-shaped housing having a front wall 58, a back wall 60, an outer wall 62, an inner wall 64, a top wall 66 and a bottom wall 68. Two support legs 24 having the floor engaging wheels 26 are pivotably coupled to the bottom wall 68 of the first tower 50 by a bracket 70. Likewise, two support legs 24 having the floor engaging wheels 26 are pivotably coupled to the bottom wall 68 of the second tower 52 by a bracket 70.

When the equipment support 20 is lifted off the floor 28 by the bed 30 or by the wall arm system 32, the support legs 24 move, as a result of a force of gravity, to a collapsed position, where the support legs 24 extend generally vertically downwardly as shown, for example, in FIG. 1. When the equipment support 20 is lowered onto the floor 28, however, the support legs 24 move, as a result of the weight of the equipment support 20 and the angled orientation (FIG. 1) of the support legs 24 in the collapsed position, to a deployed position, where the support legs 24 extend generally horizontally outwardly as shown, for example, in FIG. 2. Suitable stop mechanisms, therefore, are provided on the equipment support 20 to establish the angled positions of the support legs 24 when the equipment support 20 is lifted off the floor 28.

Two IV pole support arms 74 are coupled to the outer wall 62 of the first tower 50 by associated brackets 76 for pivoting movement about a generally vertical pivot axis 78. Likewise, two IV pole support arms 74 are pivotably coupled to the outer wall 62 of the second tower 52 by associated brackets 76 for pivoting movement about a generally vertical pivot axis 78. Each IV pole support arm 74 has a socket 80 for supporting an IV pole 82. The pivotable mounting of the IV poles 82 to the associated towers 50, 52 allows the IV poles 82 to be pivoted from a position adjacent a front 42 of the equipment support 20 to a position adjacent a rear 44 of the equipment support 20 in an arc. Pivot locks (not shown) are provided to lock the IV pole support arms 74 in place. In addition, latches 84 are provided to secure the IV poles 82 to respective sockets 80. Each IV pole 82 includes a plurality of hooks 86 for hanging IV bags (not shown). Each IV pole 82 has a handgrip 88 made of soft rubber or plastic to provide a comfortable grip.

In the illustrated embodiment, as shown in FIG. 1, the IV pole 82 coupled to the first tower 50 carries an equipment support shelf 110 for supporting patient care equipment 22, such as a monitor 112. The monitor 112 may be secured to the shelf 110 by latching brackets (not shown). The monitor 112 typically has an internal power supply. The shelf 110 is movable from an elevated position illustrated, for example, in FIG. 2, to a lowered position (not shown). The shelf 110 is secured to the IV pole 82 by a lock 114. The first tower 50 has a compartment 116 for receiving an oxygen cylinder 118 having valves 120. The outer wall 62 of the first tower 50 has a plurality of electrical outlets 122. Some of the electrical outlets 122 are powered only when the equipment support 20 is plugged into a wall outlet. On the other hand, some of the outlets 120 are automatically powered by an onboard battery 124 when the equipment support 20 is unplugged from the wall outlet. The patient care equipment 22 requiring power during transport must therefore be plugged into these outlets for an uninterrupted power supply from the battery 124.

In other embodiments, however, all electrical outlets 122 receive power from a wall outlet when the equipment support 20 is plugged thereto and then automatically switch over to receive power from the battery 124 when the equipment support 20 is unplugged therefrom. Illustratively, the onboard battery 124 is located on the second tower 52. The battery 124 is recharged when the equipment support 20 is plugged into a wall outlet. The IV pole 82 coupled to the second tower 52 supports a plurality of IV pumps 130. The IV pumps 130 typically have an internal power supply. The second tower 52 carries suction equipment 132 to provide suction during transport of a critical care patient. The monitor 112, the oxygen cylinder 118, the IV pumps 130 and the suction equipment 132 are, of course, just some of the examples of the type of equipment that could be carried by the equipment support 20. Those skilled in the art will appreciate that many other types of equipment associated with the care of a patient may be carried by the equipment support 20 in addition to, or in lieu of, the illustrative equipment shown, for example, in FIG. 1.

Figure 5:
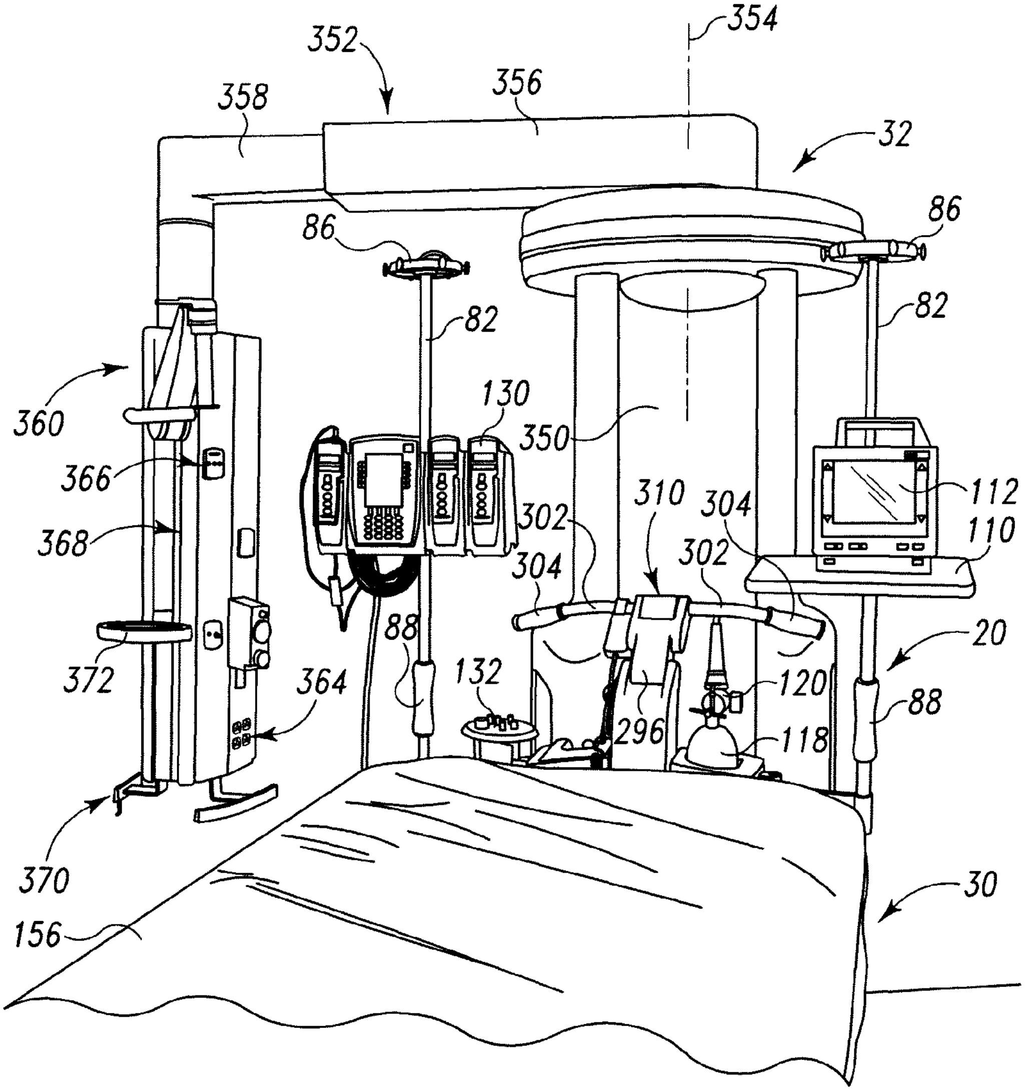
FIG. 5 is a perspective view, as viewed from the foot end of the bed, showing the equipment support positioned near the head end of the bed, and further showing the wall arm system having a pivotably-mounted telescoping arm extending outwardly from the vertically-extending support structure of the wall arm system and carrying a service head.
Figure 6:
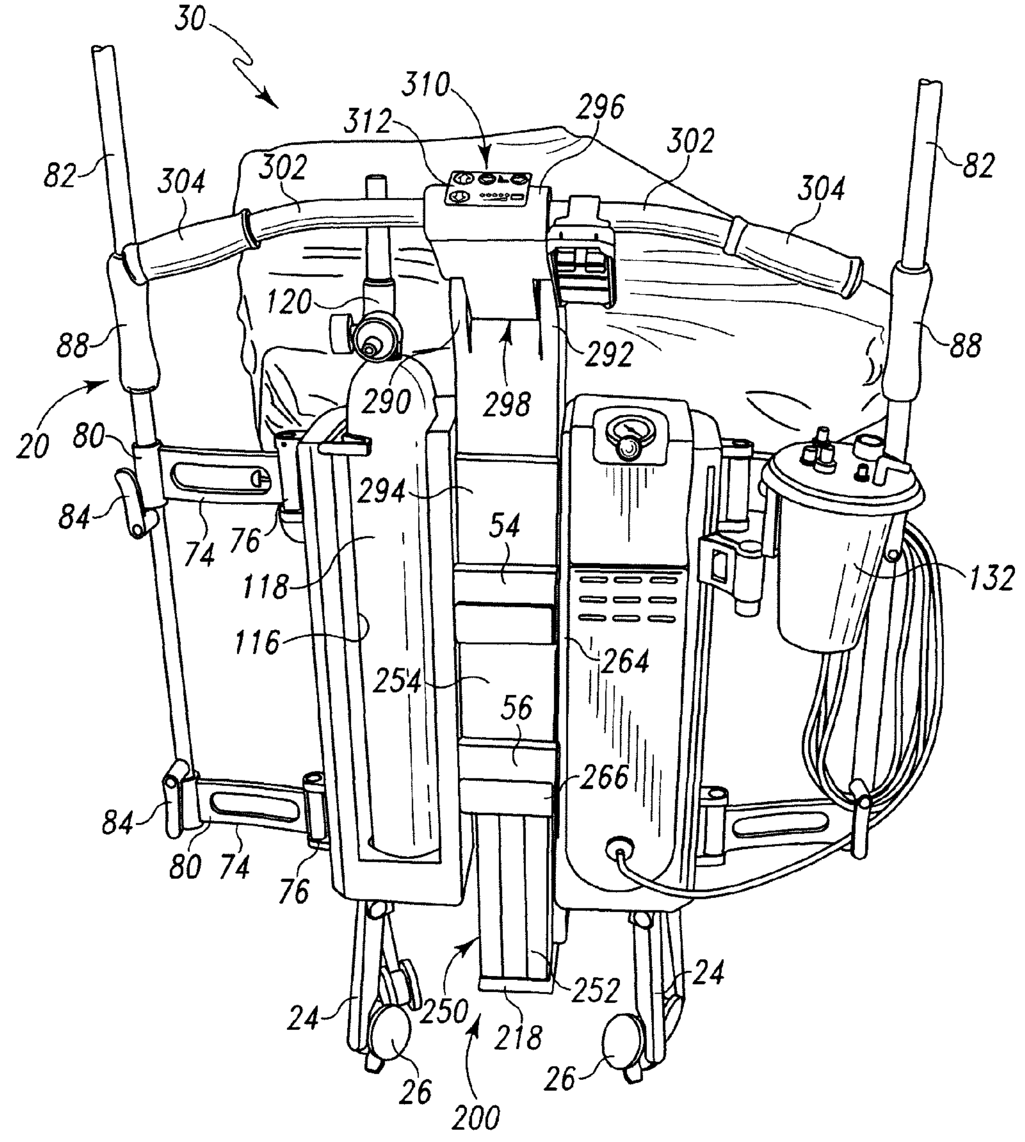
FIG. 6 is a perspective view, as viewed from the head end of the bed, showing the equipment support carried by the bed near the head end thereof, a control panel located on a pivotally-mounted mounting block coupled to an upper portion of the telescoping column, the push handles extending outwardly from the pivotally-mounted mounting block, the oxygen cylinder carried by the first tower and the suction equipment carried by the second tower.

As shown in FIGS. 4-6, the equipment support 20 is transferable from a position where the equipment support 20 is supported on the floor 28 to a position where the equipment support 20 is lifted off the floor 28 and carried by a wheeled patient support apparatus, such as the hospital bed 30. The bed 30 shown in FIGS. 2-7 is similar to the bed 30 shown in FIG. 18, with the exception of a support structure 200 used for lifting the equipment support 20 off the floor 28 and then lowering it back onto the floor 28. The bed 30 shown in FIGS. 2-7 is, of course, just one illustrative example of the type of a hospital bed that could be used with the equipment support 20. Those skilled in the art will appreciate that other types of hospital beds may very well be used with the equipment support 20.

Figure 18:
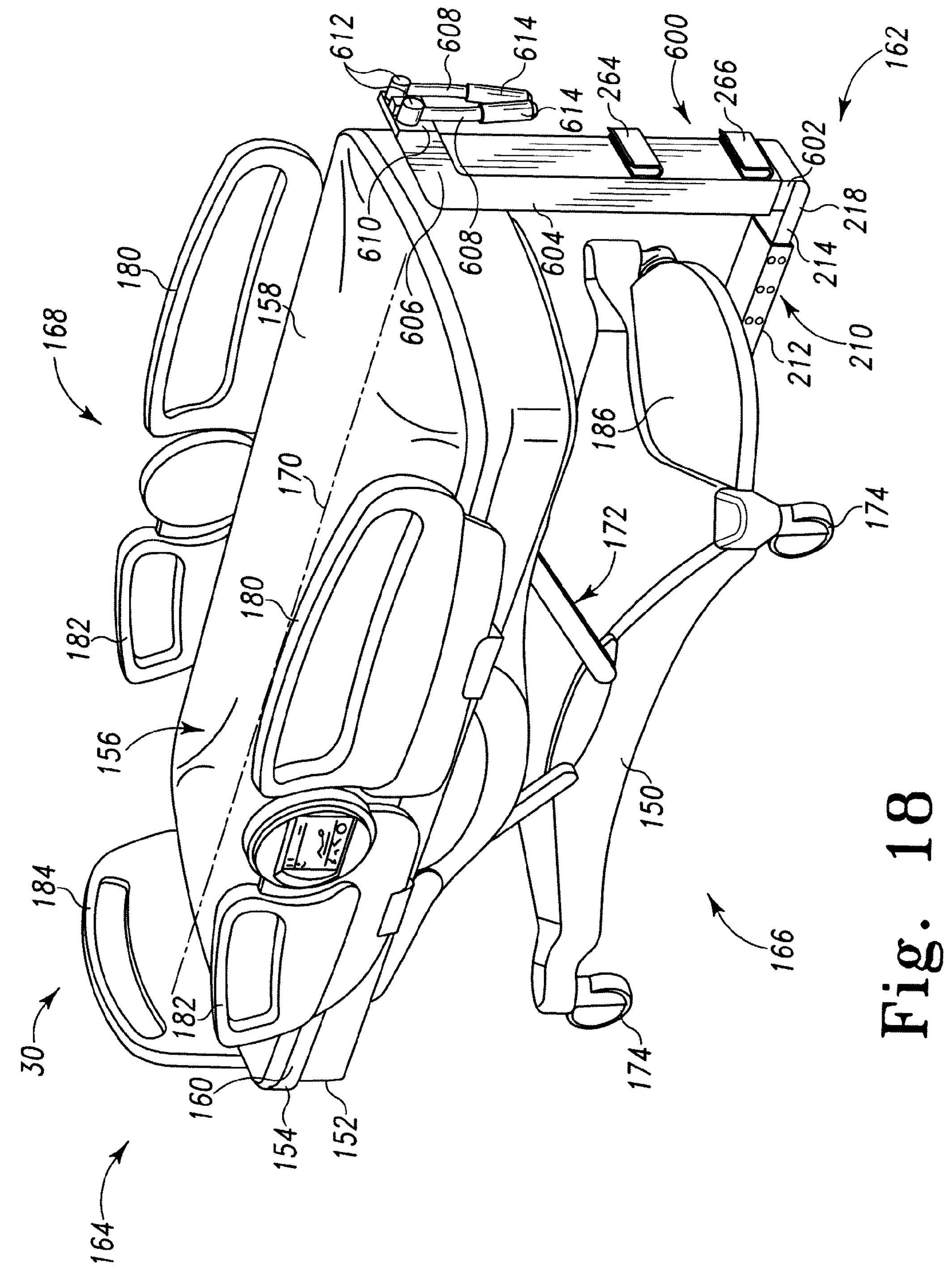
FIG. 18 is a perspective view of a hospital bed similar to the bed shown in FIGS. 2-10, with the exception of the lift used for lifting and lowering the equipment support.

As shown in FIG. 18, the illustrative bed 30 includes a lower frame 150, an upper frame 152 supported above the lower frame 150, and an articulated deck 154 supported above the upper frame 152. The deck 154 has longitudinally-spaced head, seat, thigh and foot sections. Illustratively, the seat section is fixed to the upper frame 152. The head, thigh and foot sections are movable relative to each other and relative to the seat section. A mattress 156 having a patient support surface 158 rests on the deck 154. The bed 30 includes a head end 162, a foot end 164, a left side 166, a right side 168, and a longitudinal axis 170. An elevation adjustment mechanism 172 is interposed between the lower frame 150 and the upper frame 152. The lower frame 150 is supported on four casters 174. The outer periphery of the upper frame 152 defines a footprint when projected downwardly onto the floor 28. Two side rails 180 are coupled to the head section of the deck 154. Two side rails 182 are coupled to the upper frame 152 near the foot end 164. In some embodiments, the side rails 182 are coupled to the foot section of the deck 154. In the illustrated embodiment, controls (not shown) are coupled to the head end side rails 180 to operate the elevation adjustment mechanism 172 to raise, lower and tilt the upper frame 152. A foot board 184 is coupled to the foot end 162 of the upper frame 152. A shroud 186 covers the lower frame 150.

Figure 19:
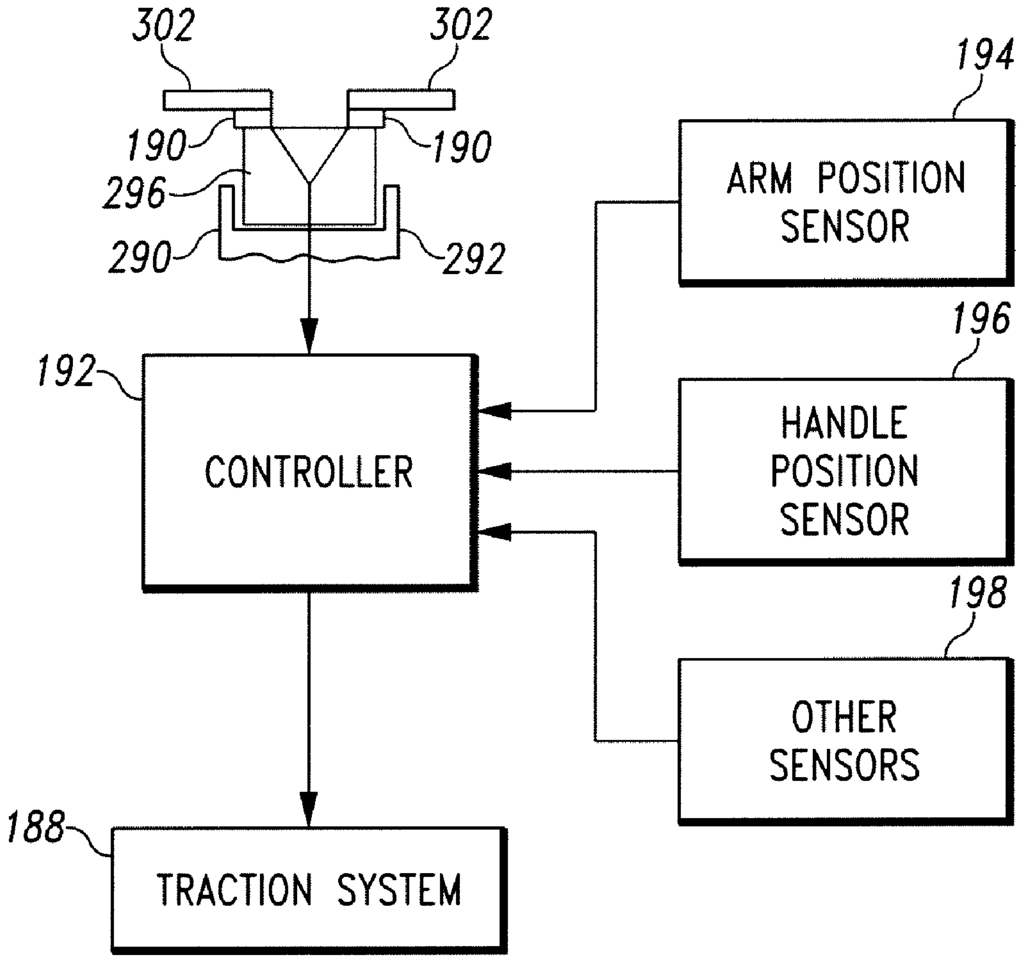
FIG. 19 is a diagrammatic view showing a motorized traction system that is coupled to a controller and that is operable to propel the bed along the floor in response to one or more input signals generated by a pair of load cells coupled to the controller and coupled to the respective push handles.

As diagrammatically shown in FIG. 19, the bed 30 includes a motorized traction system 188 that is operable to propel the bed 30 along the floor 28 via a driving wheel or belt. Examples of suitable motorized traction systems are shown in U.S. Pat. Nos. 6,330,926; 6,588,523; 6,749,034; 6,877,572; 6,902,014; 7,014,000; 7,083,012; 7,090,041; and 7,011,172, which are hereby incorporated by reference herein. Accordingly, as shown in FIG. 19, one or both push handles 302 of the bed 30 are coupled to one or more load cells or other types of force sensors 190 to provide one or more input signals to a controller 192 associated with the motorized traction system 188. Alternatively, one or both handles 302 can be coupled to a throttle device (not shown), such as a rotary potentiometer, to provide one or more input signals to the controller 192 associated with the motorized traction system 188. In some embodiments, user controls 310 (FIG. 7) of the bed 30 may include buttons for selecting the speed and the direction of travel provided by the motorized traction system 188.

As shown diagrammatically in FIG. 19, the bed 30 includes a sensor 194 to disable the motorized traction system 188 when a telescoping arm 210 (FIGS. 2-4) carrying the equipment support 20 is not centered at the head end 162 of the bed 30 as shown, for example, in FIG. 4. In some embodiments, the bed 30 includes a sensor 196 to disable the motorized traction system 188 when the handles 302 (FIGS. 2-8) are in their respective storage positions (shown, for example, in FIG. 18 with respect to handles 608). In still other embodiments, the bed 30 includes sensors 198 to determine the operational status of the bed 30, such as, for example, whether a charge level of an onboard battery is above a threshold, whether the casters brakes are not et, whether the traction system 188 is lowered into contact with the floor 28, whether a "dead man" type switch is engaged by a caregiver, whether the bed AC cord is unplugged, or whether any other conditions that need to be met are, in fact, met before the traction system 188 operates to propel the bed 30 along the floor 28. In some embodiments, the controller 192, coupled to the sensors 198, displays the operational status of the bed 30 on a monitor (not shown). In some embodiments, the controller 192, coupled to the sensors 198, activates an alarm (not shown) to alert the caregiver of an out-of-bound parameter.

Figure 7:
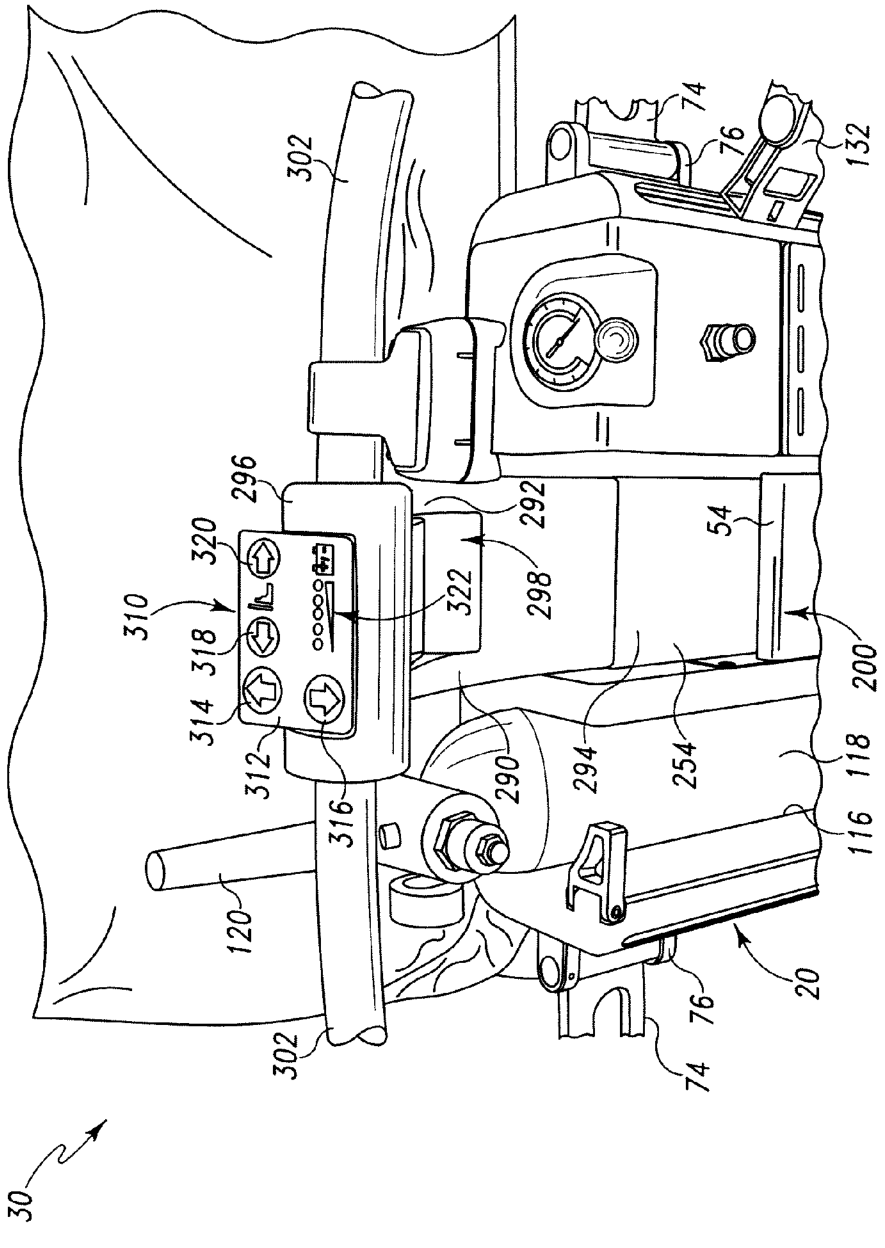
FIG. 7 is an enlarged perspective view, as viewed from the head end of the bed, showing the control panel having user controls.

In the illustrated embodiment, a foot section 160 (FIG. 18) of the bed 30 can be extended or retracted to increase or decrease the length of the foot section 160. For example, the foot section 160 can be extended for a taller patient and the foot section can be retracted for a shorter patient. Accordingly, as shown in FIG. 7, the user controls 310 include a foot section extension button 318 to increase the length of the foot section 160 and a foot section retraction button 320 to decrease the length of the foot section 160. Examples of beds with extendible and retractable foot sections are shown in U.S. Pat. Nos. 5,715,548; 6,212,714; 6,446,993; 6,684,427; and 6,880,189, which are hereby incorporated by reference herein.

Figure 8:
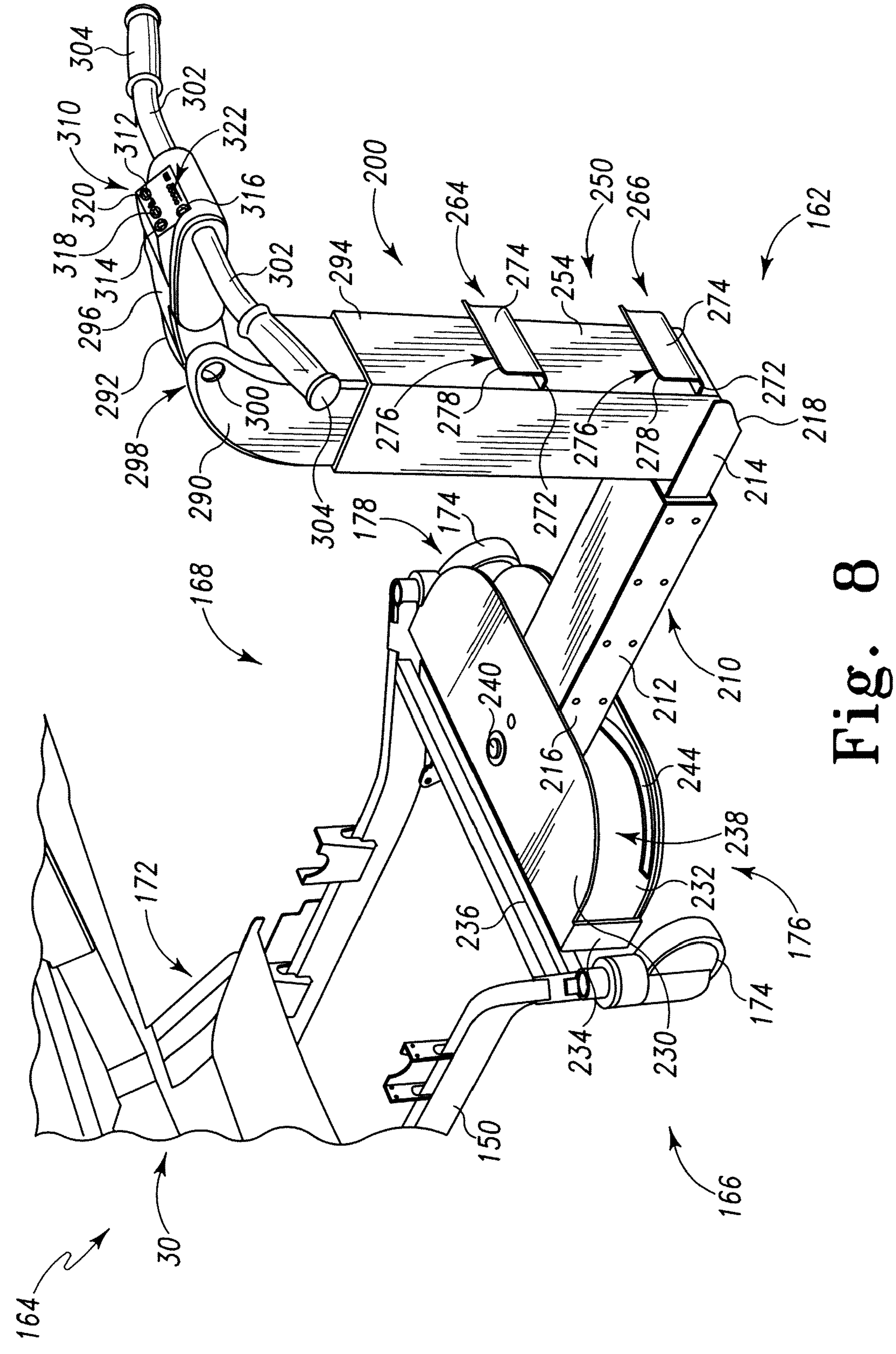
FIG. 8 is a perspective view, with portions broken away, of the lower frame of the bed with a shroud removed to expose the lower frame, showing a support structure having upper and lower vertically-spaced flanges extending outwardly from the head end of the lower frame, the upper and lower vertically-spaced flanges defining an arm-receiving space, a guide track formed in the lower flange, the outer tube of the telescoping arm extending outwardly from the arm-receiving space, the inner tube of the telescoping arm extending outwardly from the outer tube, the telescoping column or lift extending upwardly from a terminal portion of the inner tube, the vertically aligned upper and lower couplers carried by the column, the control panel located on the pivotally-mounted mounting block of the column, and the push handles extending outwardly from the pivotally-mounted mounting block.
Figure 9:
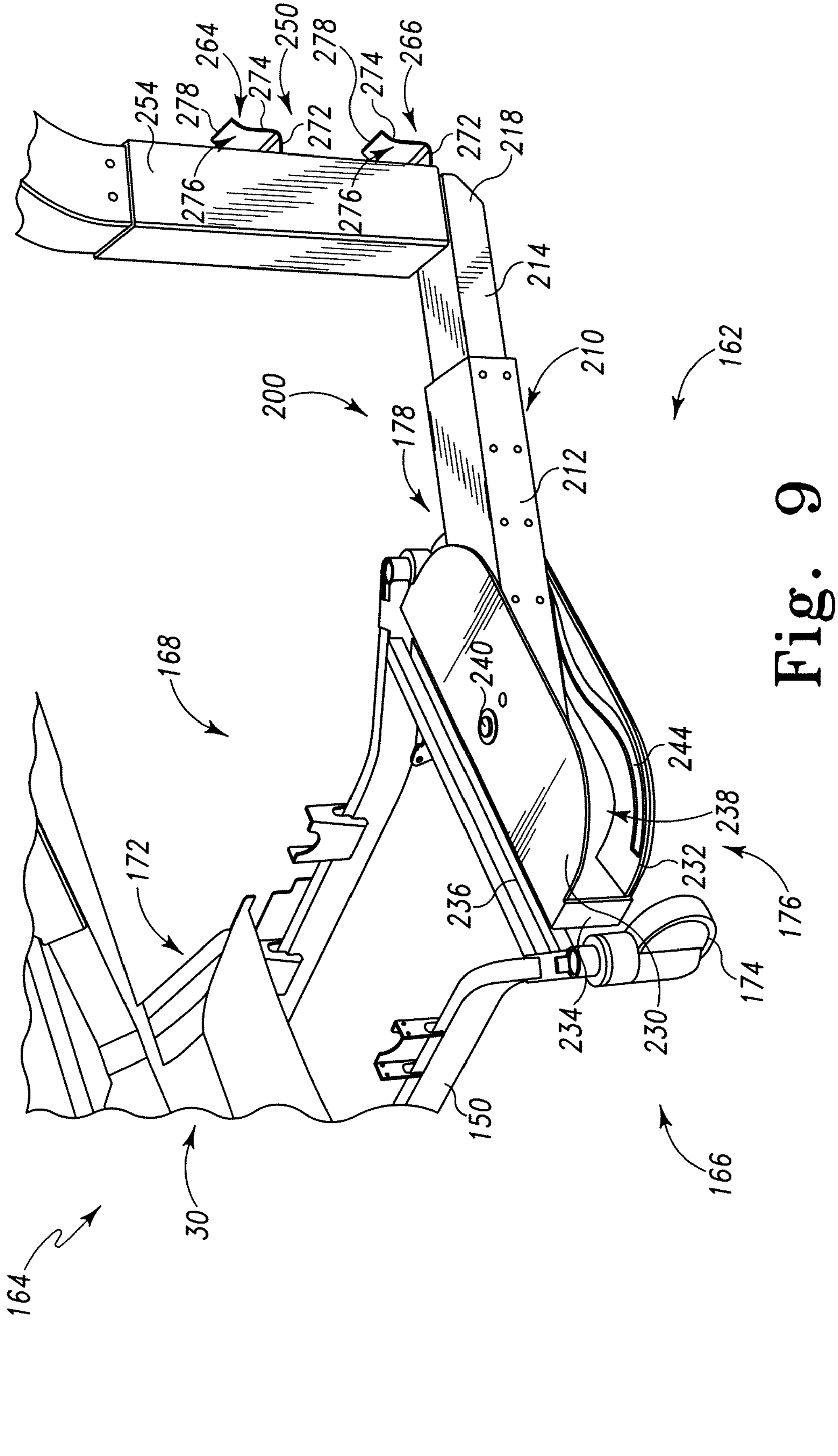
FIG. 9 is a view, similar to FIG. 8, showing the telescoping arm of the bed carrying the column pivoted toward a right side of the bed.

As shown generally in FIGS. 2-10 and particularly in FIGS. 8-10, the support structure 200 includes a telescoping arm 210 that extends generally horizontally outwardly from the head end 162 of the lower frame 150. In the illustrated embodiment, the arm 210 comprises an outer tube 212 and an inner tube 214 configured to telescope relative to the outer tube 212. In other embodiments, however, this arrangement of the inner/outer tubes of the telescoping arm 210 may be reversed. Illustratively, telescoping movement of the arm 210 is manual. In some embodiments, however, the telescoping movement of the arm 210 is under the power of an electric motor or other suitable driver (not shown) housed in the outer tube 212. In the illustrated embodiment, the support structure 200 is spaced from the floor 28.

As shown in FIGS. 8-10, the support structure 200 includes upper and lower vertically-spaced flanges 230, 232 which extend horizontally outwardly from a laterally-extending bar 234. The bar 234 is, in turn, fixedly attached to a head end frame member 236 of the lower frame 150 by suitable fasteners, such as pins, studs, nut and bolt combinations, and the like. A proximal end 216 of the outer tube 212 of the arm 210 is received in a space 238 defined by the vertically-spaced flanges 230, 232 and mounted thereto for pivoting movement about a pivot pin 240. Illustratively, the arm 210 is manually pivoted about the pivot pin 240. In some embodiments, however, the pivoting movement of the arm 210 is under the power of an electric motor or other suitable driver (not shown) housed in the outer tube 212. The arm 210 is pivotable between a position on the left side 166 of the bed 30 and a position on the right side 168 of the bed 30, as shown, for example, in FIG. 9, through an intermediate position near the head end 162 of the bed 30 as shown, for example, in FIG. 8.

As shown generally in FIGS. 8-10 and particularly in FIG. 10, the lower flange 232 is formed to include a curved track 244, including, in some embodiments, portions that are elliptical, that is configured to receive a pin 246 that extends downwardly from the inner tube 214 of the arm 210 through an elongate slot 248 in the outer tube 212 of the arm 210. The reception of the pin 246 in the track 244 forms a linkage 242 (FIG. 10) that moves the inner tube 214 of the arm 210 along a longitudinal axis 220 (FIG. 10) in response to the pivoting movement of the arm 210. The arm 210 can pivot from a central position near the head end 162 of the bed 30, as shown, for, example, in FIG. 8, to a position near a left or right side 166, 168 of the bed 30, as shown, for, example, in FIG. 4, through an intermediate position near a corner 176, 178 of the bed 30, as shown, for, example, in FIG. 9. The inner tube 214 of the arm 210 initially moves generally outwardly as the arm 210 pivots from the central position near the head end 162 of the bed 30 to the intermediate position near a corner 176, 178 of the bed 30. The inner tube 214 of the arm 210 then moves generally inwardly as the arm 210 pivots from the intermediate position near a corner 176, 178 of the bed 30 to the position near the left or right side 166, 168 of the bed 30. This outward and inward movement of the inner tube 214 of the arm 210 allows the equipment support 20 carried by the inner tube 214 to remain close to the bed 30 as it arcs around the corners of the frame 150 at the head end 162 of the bed 30.

Figure 20:
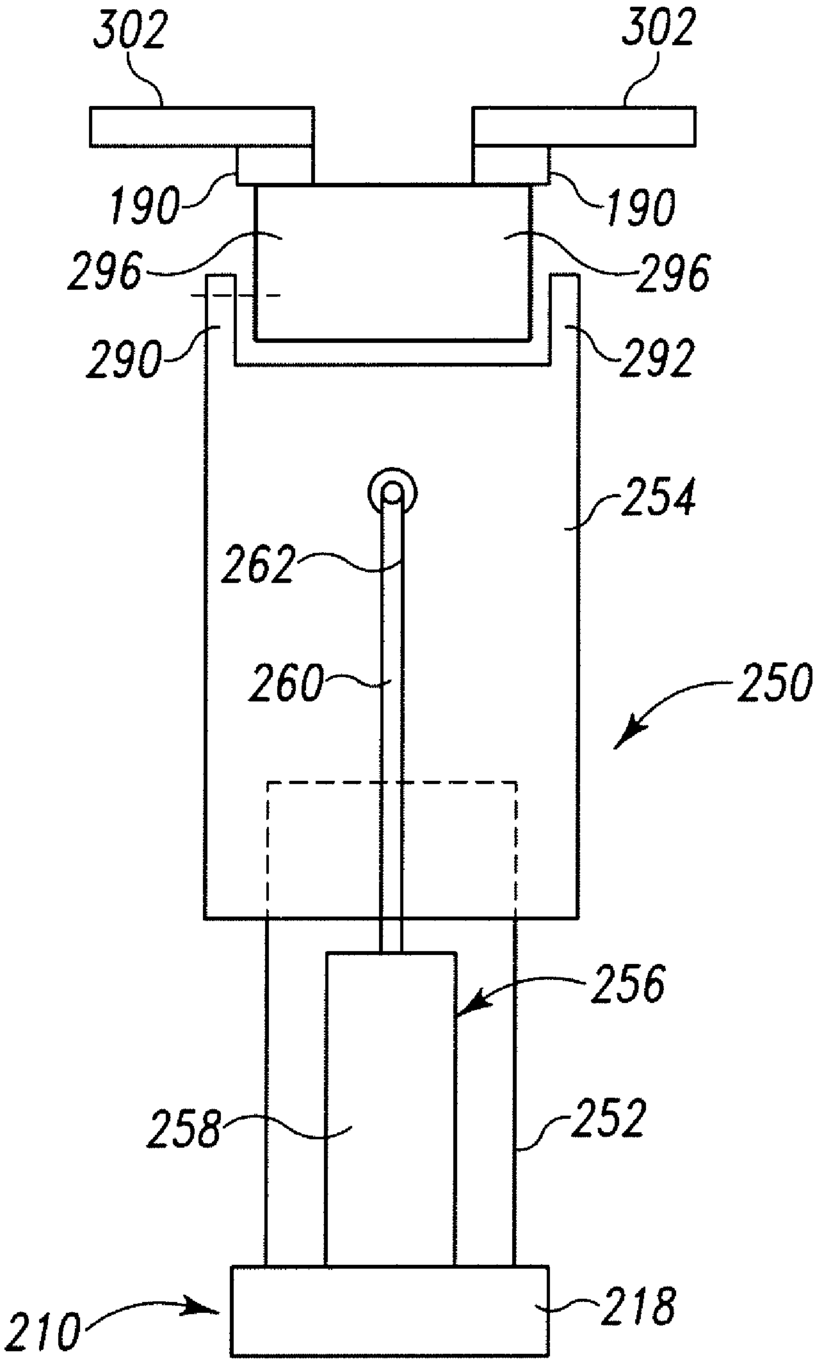
FIG. 20 is a diagrammatic view of the lift of the bed showing an actuator having a housing fixed to the telescoping arm of the bed and a piston rod that extends out of and retracts into the housing and coupled to an outer telescoping tube of the lift.

As shown generally in FIGS. 2-10 and particularly in FIGS. 8-9, the support structure 200 includes a telescoping column or lift 250 comprising an inner tube 252 (FIG. 6) fixed to a terminal portion 218 of the inner tube 214 of the arm 210 and an outer tube 254 sleeved over the inner tube 252 and configured to telescope relative thereto under the power of an electric motor or other suitable driver, such as a linear actuator 256 (FIG. 20), housed in the inner tube 252. In other embodiments, however, this arrangement of the inner/outer tubes of the lift 250 may be reversed. As diagrammatically shown in FIG. 20, the actuator 256 has a housing 258 and a piston rod 260 that extends out of and retracts into the housing 258. The housing 258 is fixed to the terminal portion 218 of the arm 210. A free end 262 of the piston rod 260 is coupled to the outer tube 254 of the lift 250. As shown in FIGS. 8-9, the outer tube 254 of the lift 250 has upper and lower hook-like couplers 264, 266 which are vertically aligned and which are configured to be detachably coupled to the respective vertically-aligned upper and lower couplers 54, 56 (FIG. 1) of the equipment support 20 when the equipment support 20 is carried by the bed 30 as shown, for example, in FIG. 4.

As shown in FIG. 1, each equipment support coupler 54, 56 comprises a horizontally-extending block 270 interconnecting the two towers 50, 52. As shown in FIGS. 8-9, each bed coupler 264, 266 comprises a bottom wall 272 attached to the outer tube 254 of the lift 250 and a side wall 274 that extends upwardly from an outer edge of the bottom wall 272 to define a block-receiving space 276 as shown in FIG. 8. The equipment support blocks 270 (FIG. 1) are sized for close fit sliding reception into the respective block-receiving spaces 276 (FIGS. 8-9) when the equipment support 20 is lifted off the floor 28 by the bed 30, as shown, for example, in FIG. 4. As shown in FIGS. 8-9, the upper portions 278 of the side walls 274 of the bed couplers 264, 266 are flared outwardly to compensate for any misalignment between the blocks 270 of the equipment support couplers 54, 56 and the block-receiving spaces 276 of the bed couplers 264, 266 as the equipment support 20 is lifted off the floor 28 by the bed 30.

The vertical spacing between the equipment support couplers 54, 56 and the vertical spacing between the bed couplers 264, 266 are about equal so that the weight of the equipment support 20 is equally shared by the two bed couplers 264, 266 when the equipment support 20 is carried by the bed 30. Also, the vertical spacing between the equipment support couplers 54, 56 is sufficient to allow the upper bed coupler 264 to move to a position between the equipment support couplers 54, 56 prior to the lift 250 being operated to raise the bed couplers 264, 266 into engagement with the respective equipment support couplers 54, 56. The couplers 54, 56 not only serve to rigidly interconnect the two towers 50, 52 of the equipment support 20, but also facilitate the attachment of the equipment support 20 to the lift 250 of the bed 30 when the equipment support 20 is carried by the bed 30.

The lift 250 is supported by the inner tube 214 of the arm 210 outside a footprint of the upper frame 152 as shown in FIGS. 4-6. The outward and inward movement of the inner tube 214 of the arm 210 as the arm 210 pivots around the head end 162 of the bed 30 allows the lift 250 and the attached equipment support 20 to be swung away from the head end 162 of the bed 30 to provide improved access to a patient lying on the bed 30 while maintaining the equipment support 20 and the patient care equipment 22 close to the head end 162 of the bed 30. Illustratively, the actuator 256 (FIG. 20) used for causing the telescoping movement of the lift 250 is a linear actuator of the type commercially available from the Linak Company of Denmark. It is, however, understood that drivers such as manual cranks, fractional horsepower motors, hydraulic cylinders, magnetic cylinders, pneumatic cylinders, and the like may very well be used in lieu of the linear actuator.

As shown in FIGS. 6-8, a pair of laterally-spaced flanges 290, 292 extend upwardly and outwardly from an upper portion 294 of the outer tube 254 of the lift 250. A mounting block 296 is received in a space 298 defined by the laterally-spaced flanges 290, 292 for pivoting movement about pivot pins 300 (FIG. 8). Pivot locks (not shown) are provided to lock the mounting block 296 in place. In other embodiments, the block 296 may be fixed to the flanges 290, 292. A pair of push handles 302 extend outwardly from opposite ends of the mounting block 296. Each push handle 302 has a handgrip 304 made of soft rubber or plastic to provide a comfortable grip. The handgrips 304 are grippable by a caregiver to maneuver the bed 30 along the floor 28.

In the illustrated embodiment, the actuator 256 (FIG. 20) is actuated by user controls 310 mounted on a control panel 312 located on the mounting block 296 as shown in FIG. 7. Illustratively, the user controls 310 include a column Up-button 314 to raise the outer tube 254 of the lift 250 and a column Down-button 316 to lower the outer tube 254 of the lift 250. In addition, the user controls 310 include a foot section extension button 318 to increase the length of the foot section 160 and a foot section retraction button 320 to decrease the length of the foot section 160. Also, the control panel 312 includes a series of indicators 322 to indicate a charge level of the onboard battery 122. Alternatively and/or additionally, in some embodiments, the user controls 310 are located on a wired or wireless remote control device (not shown).

In the illustrated embodiment, the push handles 302 are located above the patient support surface 158 of the mattress 156 regardless of the vertical position of the outer tube 254 of the lift 250. In embodiments where the telescoping movement of the inner tube 214 of the arm 210 is under the power of an electric motor or other suitable driver, the user controls 310 may include an arm In-button (not shown) to cause the inner tube 214 of the arm 210 to retract to, in turn, move the lift 250 and the equipment support 20 closer to the bed 30 and an arm Out-button (not shown) to cause the inner tube 214 of the arm 210 to extend to, in turn, move the lift 250 and the equipment support 20 away from the bed 30. Likewise, in embodiments where the pivoting movement of the arm 210 is under the power of an electric motor or other suitable driver, the user controls 310 may include an arm Left-button (not shown) to cause the arm 210, the lift 250 and the equipment support 20 to pivot to the left side 166 of the bed 30 and an arm Right-button (not shown) to cause the arm 210, the lift 250 and the equipment support 20 to pivot to the right side 168 of the bed 30.

To transfer equipment support 20 from a position where the equipment support 20 is supported on the floor 28 to a position where the equipment support 20 is carried by the bed 30, the equipment support 20 is moved to a position where the vertically-aligned upper and lower couplers 264, 266 of the bed 30 are positioned generally below the vertically-aligned upper and lower couplers 54, 56 of the equipment support 20 as shown, for example, in FIG. 3 and the outer telescoping tube 254 of the lift 250 carrying the bed couplers 264, 266 is raised. As the outer telescoping tube 254 of the lift 250 is raised, the blocks 270 of the equipment support couplers 54,

56 slide into the block-receiving spaces 276 of the respective bed couplers 264, 266. As shown in FIGS. 8-9, the upper portions 278 of the side walls 274 of the bed couplers 264, 266 are flared outwardly to compensate for any misalignment between the blocks 270 of the equipment support couplers 54, 56 and the block-receiving spaces 276 of the bed couplers 264, 266 as the equipment support 20 is lifted off the floor 28 by the bed 30. As the outer telescoping tube 254 of the lift 250 is further raised, the equipment support 20 is lifted off the floor 28 by the bed 30, as shown, for example, in FIG. 4.

In the illustrated embodiment, the angular position of the arm 210 carrying the equipment support 20 may be adjusted before or after the equipment support 20 is lifted off the floor 28. In addition, the bed 30 carrying the equipment support 20 can be rolled along the floor 28 to another location. When the equipment support 20 is lifted off the floor 28, the support legs 24 of the equipment support 20 move, as a result of a force of gravity, to a collapsed position, where the support legs 24 extend generally vertically downwardly as shown, for example, in FIG. 4. Suitable stop mechanisms, therefore, are provided on the equipment support 20 to establish the angled positions of the support legs 24 when the equipment support 20 is lifted off the floor 28.

To transfer the equipment support 20 from a position where the equipment support 20 is carried by the bed 30 to a position where the equipment support 20 is lowered onto the floor 28, the sequence of steps is reversed. Thus, the outer tube 254 of the lift 250 carrying the equipment support 20 is lowered until equipment support 20 is fully supported on the support legs 24 as shown, for example, in FIG. 2. After the equipment support 20 is lowered onto the floor 28, the equipment support 20 can be rolled along the floor 28 to another location. When the equipment support 20 is supported on the floor 28, the support legs 24 extend generally horizontally outwardly.

In the embodiment illustrated in FIGS. 2-10, the width of the equipment support 20, the width of the support structure 200, and the width of the lower frame 150 are about equal. In other embodiments, however, the width of the equipment support 20 is less than the width of the support structure 200 and the width of the support structure 200 is less than the width of the lower frame 150. Attachment of the equipment support 20 to the lower frame 150, instead of the upper frame 152, allows the equipment support 20 to be taller than some prior art equipment supports which enables it to have an increased number of patient care devices 22. In addition, by having the equipment support 20 carried by the lower frame 150, instead of the upper frame 152, the movement of the upper frame 152 to Trendelenburg and reverse-Trendelenburg positions, or other tilted positions, does not affect the orientation of the equipment support 20.

Referring to FIG. 5, the wall arm system 32 includes a generally vertically-disposed support structure 350 that extends upwardly from the floor 28. A telescoping arm 352 is mounted to the support structure 350 for pivoting movement about a generally vertical axis 354. The arm 352 comprises an outer tube 356 and an inner tube 358 coupled to the outer tube 356 and configured to telescope relative to the outer tube 356. Non-telescopic arms are contemplated by this disclosure as well. Also contemplated by this disclosure are devices with some or all of the vertically-disposed support structure 350 omitted, such as, for example, ceiling or wall-mounted arms. A service head 360 is coupled to a distal end of the inner tube 358. The service head 360 includes a plurality of electrical outlets 364, a plurality of gas outlets 366, a plurality of accessory mounting tracks 368, a plurality of accessory mounting rails 370, and a handle 372 coupled to an accessory mounting track 368. The pivoting movement of the arm 352 about the vertical axis 354 and the horizontal telescoping movement of the arm 352 allow the service head 360 to be positioned at any desirable location within a range of movements. The wall arm system 32 shown in FIG. 5 is, of course, just one illustrative example of the type of a device that could be used with the equipment support 20. Those skilled in the art will appreciate that other types of devices, such as a floor-supported stand, a wheeled cart or dolly, a headwall, a wall of a hospital room, and the like, may very well be used with the equipment support 20.

FIGS. 11-17 show a second embodiment 400 of the equipment support transfer system 100 comprising the bed 30, the wall arm system 32 and an equipment support 420. The bed 30 shown in FIGS. 11-16 is similar to the bed 30 shown in FIGS. 2-10, except that the support structure 200 shown in FIGS. 2-10 is replaced with a support structure 500 shown in FIGS. 11-16. The wall arm system 32 shown in FIGS. 11-14 is similar to the wall arm system 32 disclosed in FIGS. 2-5, except that the service head 360 shown in FIG. 5 is replaced with a service head 560 shown in FIGS. 11-14.

Figure 12:
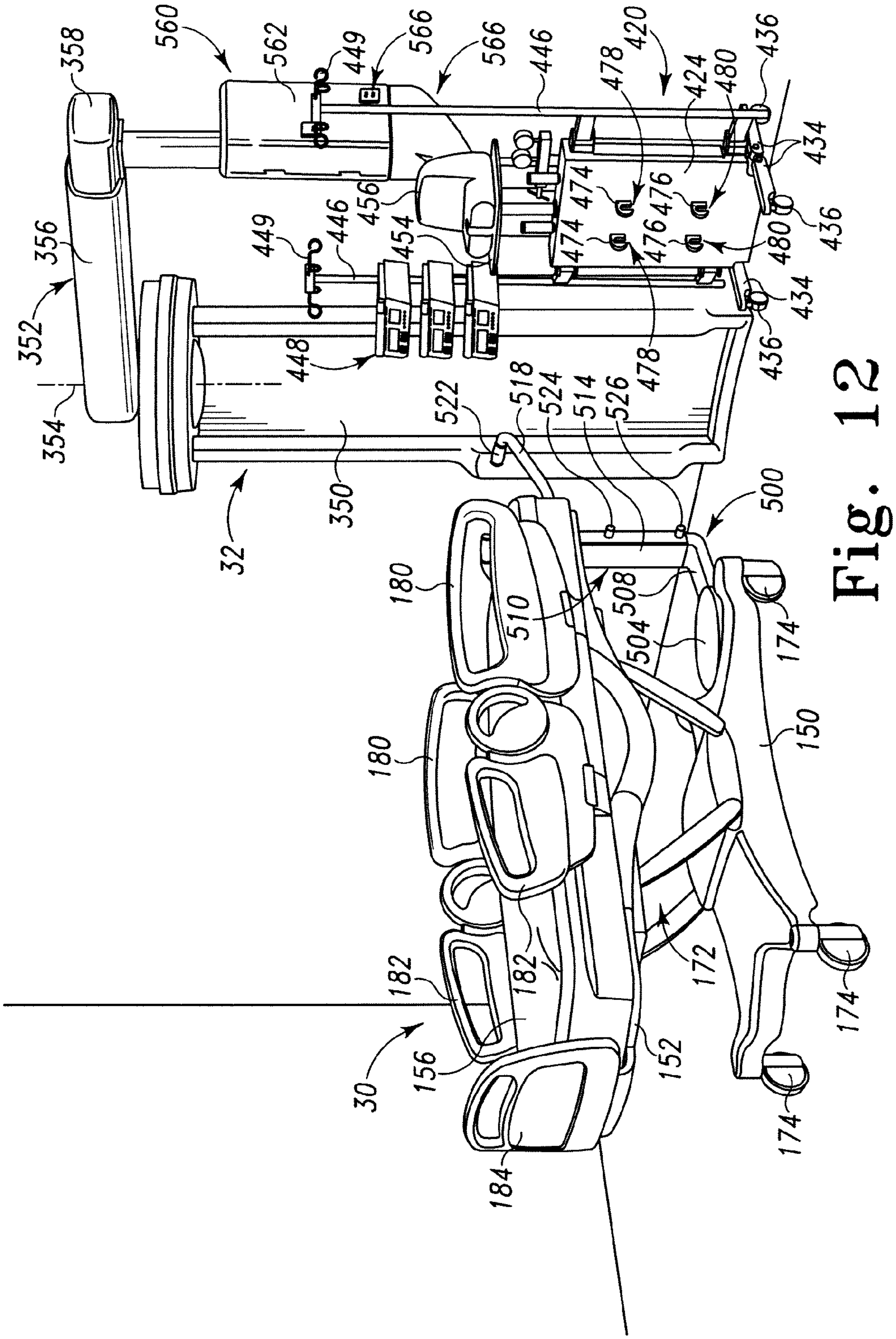
FIG. 12 is a perspective view, similar to FIG. 12, showing the equipment support lowered onto the floor where vertically-aligned couplers of the wall arm system lie below respective vertically-aligned couplers of the equipment support.
Figure 13:
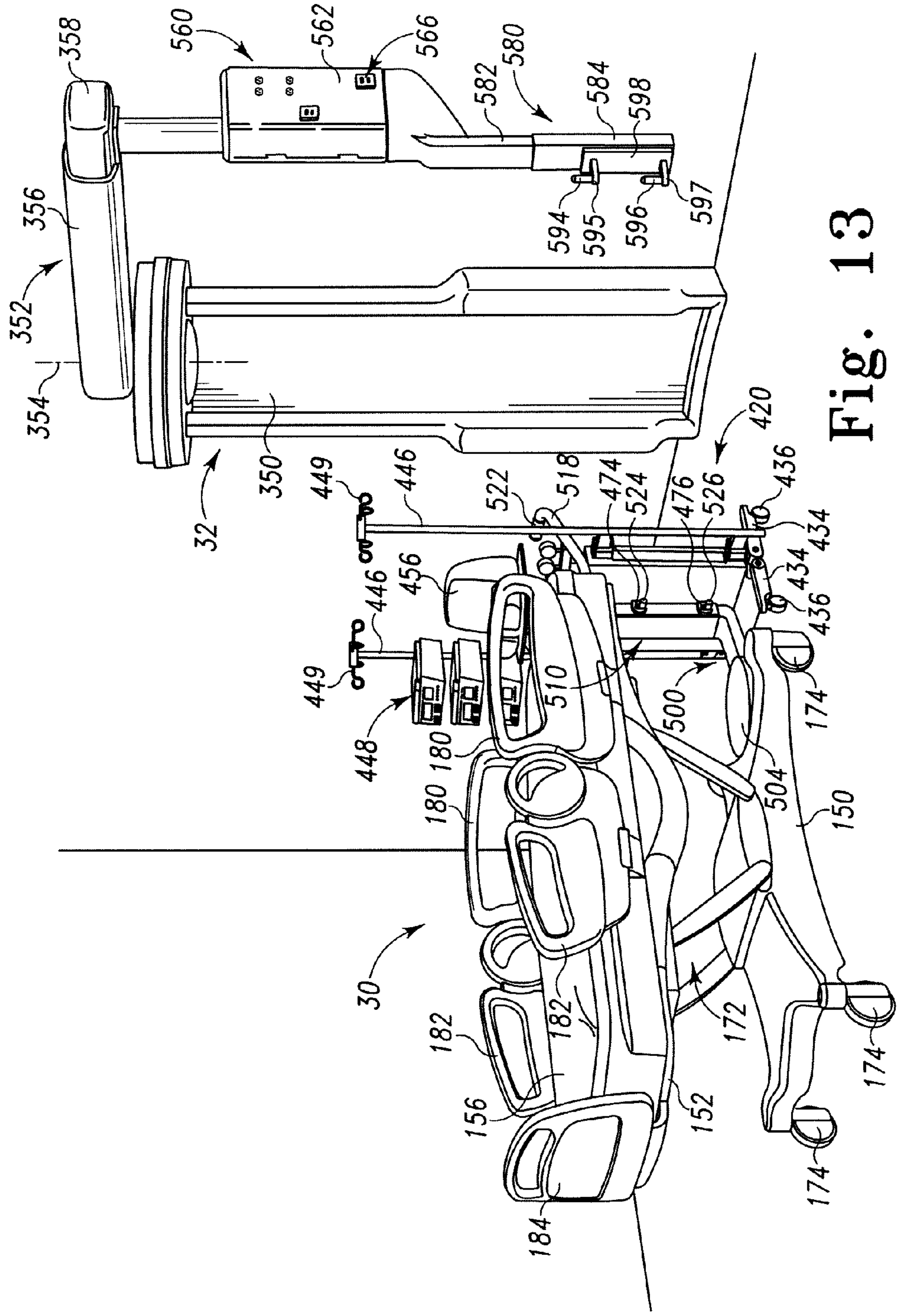
FIG. 13 is a perspective view, similar to FIG. 13, showing the equipment support moved closer to a head end of the bed where vertically-aligned couplers of the bed lie below respective vertically-aligned couplers of the equipment support.
Figure 14:
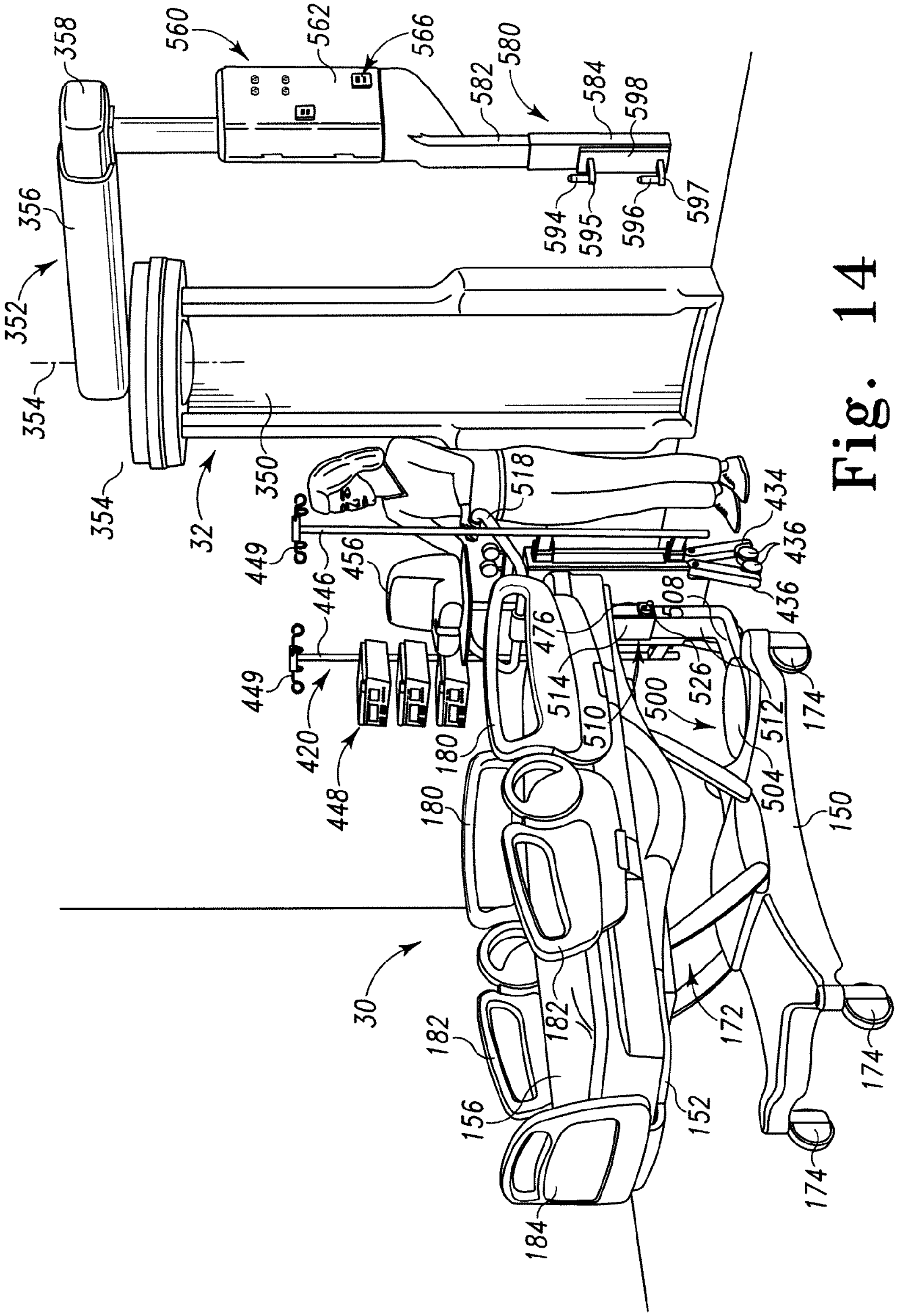
FIG. 14 is a perspective view, similar to FIG. 13, showing the equipment support lifted off the floor by a telescoping column or lift of the bed to a position where the support legs and the floor-engaging wheels of equipment support are spaced from the floor, and further showing a caregiver standing near the head end of the bed and holding push handles of the bed so that the caregiver can transport the bed along with the equipment support.
Figure 15:
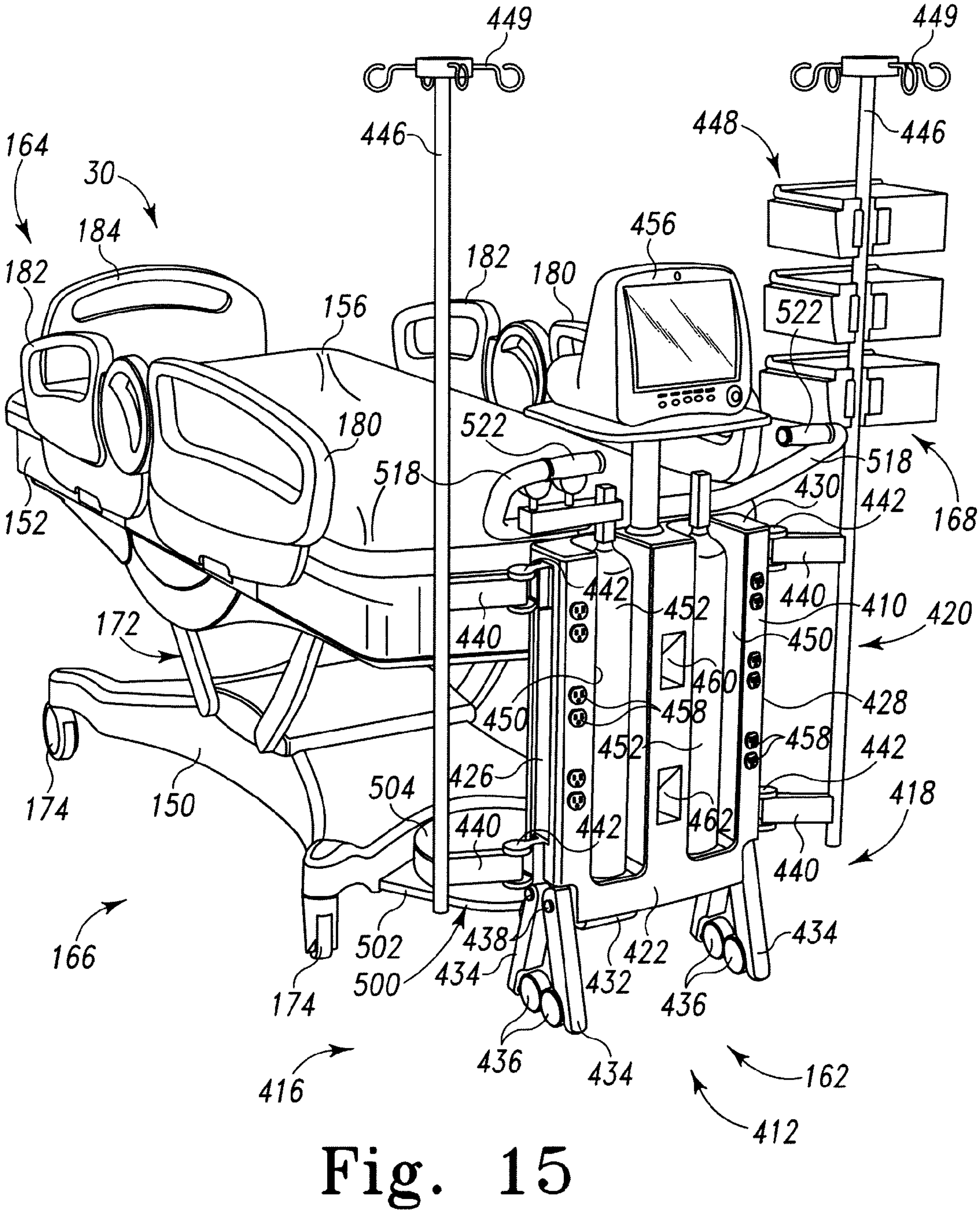
FIG. 15 is a perspective view, as viewed from the head end of the bed, showing the equipment support carried by the bed near the head end thereof.
Figure 16:
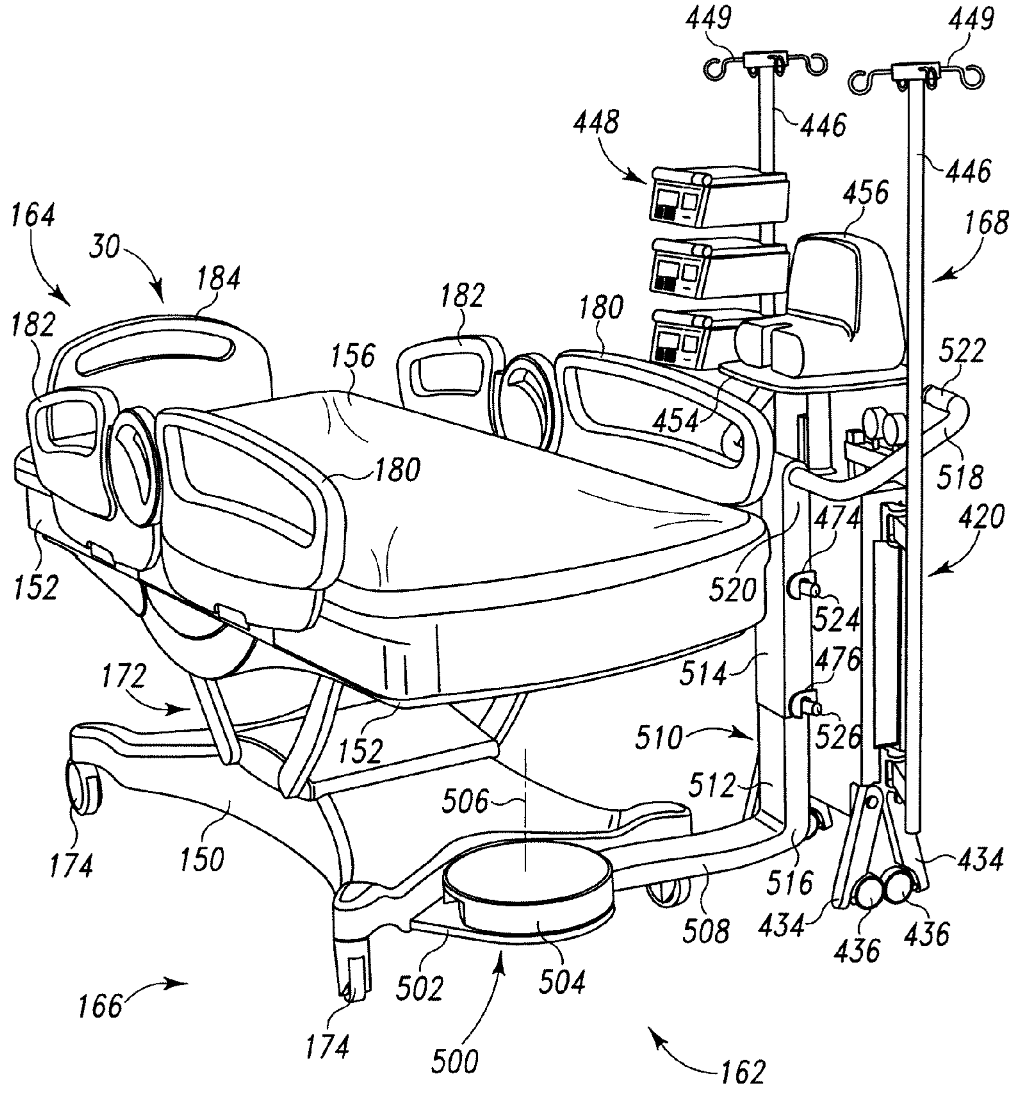
FIG. 16 is a perspective view, similar to FIG. 15, showing the equipment support carried by the bed moved to a position near a right side of the bed.

The equipment support 420 is transferable from a position where the equipment support 420 is carried by the wall arm system 32 as shown in FIG. 11 to a position where the equipment support 420 is supported on the floor 28 as shown in FIGS. 12-13. The equipment support 420 can be lifted off the floor 28 either by the bed 30 as shown in FIGS. 14-16 or by the wall arm system 32 as shown in FIG. 11. In addition, the equipment support 420 is directly transferable from the bed 30 to the wall arm system 32 and from the wall arm system 32 to the bed 30 without first lowering the equipment support 20 onto the floor 28.

As shown generally in FIGS. 11-16 and particularly in FIG. 15, the equipment support 420 comprises a rectangular, box-shaped housing 410 having a front wall 422, a back wall 424 (FIG. 11), a left wall 426, a right wall 428, a top wall 430 and a bottom wall 432. Two support legs 434 having floor engaging wheels 436 are pivotably coupled to the bottom wall 432 of the equipment support 420 on a left side 416 thereof by respective pivot pins 438. Two support legs 434 having floor engaging wheels 436 are pivotably coupled to the bottom wall 432 of the equipment support 420 on a right side 418 thereof by respective pivot pins 438. When the equipment support 420 is lifted off the floor 28 by the bed 30 or by the wall arm system 32, the support legs 434 move, as a result of a force of gravity, to a collapsed position, where the support legs 434 extend generally vertically downwardly as shown in FIGS. 11 and 14-16. When the equipment support 420 is lowered onto the floor 28, however, the support legs 434 move, as a result of the weight of the equipment support 420 and the angled orientation (FIGS. 11 and 14-16) of the support legs 434 in the collapsed position, to a deployed position, where the support legs 434 extend generally horizontally outwardly as shown in FIGS. 12, 13. Suitable stop mechanisms, therefore, are provided on the equipment support 420 to establish the angled positions of the support legs 434 when the equipment support 420 is lifted off the floor 28.

Two IV pole support arms 440 are coupled to the left wall 426 of the equipment support 420 by associated brackets 442 for pivoting movement about a generally vertical pivot axis (not shown). The two IV pole support arms 440 coupled to the left wall 426 support an IV pole 446. Likewise, two IV pole support arms 440 are coupled to the right wall 428 of the equipment support 420 by associated brackets 442 for pivoting movement about a generally vertical pivot axis (not shown). The two IV pole support arms 440 coupled to the right wall 428 support an IV pole 446. The pivotable mounting of the IV poles 446 to the associated side walls 426, 428 allows the IV poles 446 to be pivoted from a position adjacent a front 412 of the equipment support 420 to a position adjacent a rear 414 of the equipment support 420 in an arc. Pivot locks (not shown) are provided to lock the IV pole support arms 440 in place. Each IV pole 446 has a handgrip (not shown) made of soft rubber or plastic to provide a comfortable grip.

In the illustrated embodiment, as shown in FIGS. 11-16, the IV pole 446 coupled to the right wall 428 of the equipment support 420 supports a plurality of IV pumps 448. The IV pumps 448 typically have an internal power supply. Each IV pole 446 includes a plurality of hooks 449 for hanging IV bags (not shown). As shown in FIG. 15, the front wall 422 of the equipment support 420 is formed to include two compartments 450 for receiving oxygen cylinders 452. An equipment support shelf 454 is coupled to the top wall 430 of the equipment support 420 for supporting patient care equipment 22, such as a monitor 456. The monitor 456 may be secured to the shelf 454 by latching brackets (not shown). The monitor 456 typically has an internal power supply. The shelf 454 is movable between an elevated position illustrated, for example, in FIGS. 11-16, and a lowered position (not shown).

As shown in FIG. 15, a plurality of electrical outlets 458 are coupled to the front wall 422 of the equipment support 420. Some of the electrical outlets 458 are powered only when the equipment support 420 is plugged into a wall outlet. On the other hand, some of the outlets 458 are automatically powered by an onboard battery (not shown) when the equipment support 420 is unplugged from the wall outlet. The patient care equipment 22 requiring power during transport must therefore be plugged into these outlets 458 for an uninterrupted power supply from the onboard battery. In other embodiments, however, all electrical outlets 458 receive power from a wall outlet when the equipment support 20 is plugged thereto and then automatically switch over to receive power from the onboard battery when the equipment support 20 is unplugged therefrom. The onboard battery is recharged when the equipment support 20 is plugged into a wall outlet. Suction equipment (not shown) may be coupled to the front wall 422 of the equipment support 420 to provide suction during transport of a critical care patient.

The IV pumps 448, the oxygen cylinders 452, the monitor 456 and the suction equipment (not shown) are, of course, just some of the examples of the type of equipment that could be carried by the equipment support 420. Those skilled in the art will appreciate that many other types of equipment associated with the care of a patient may be carried by the equipment support 420 in addition to, or in lieu of, the illustrative equipment shown, for example, in FIG. 15.

Figure 17:
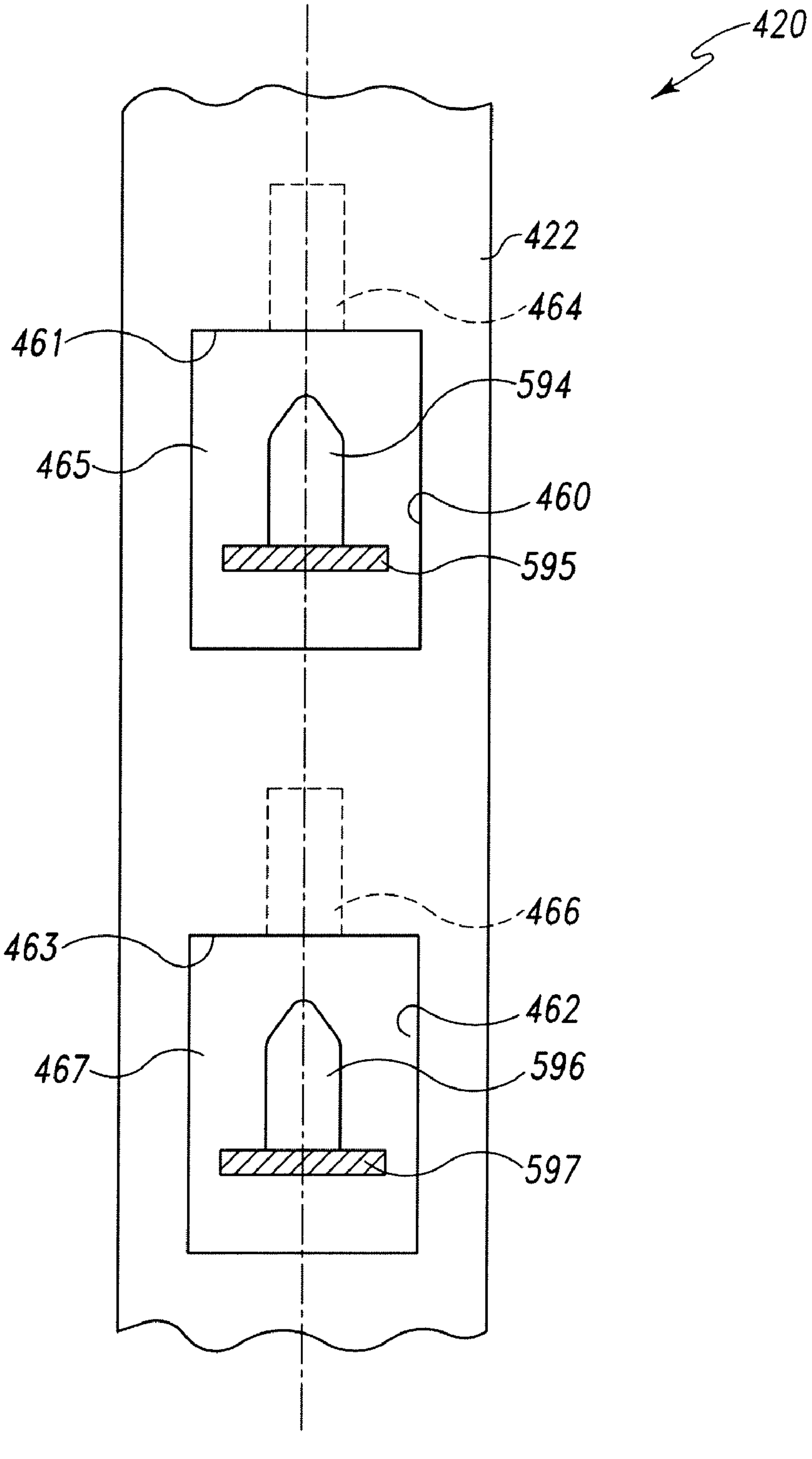
FIG. 17 is a diagrammatic view showing upwardly-extending upper and lower pins of the wall arm system positioned below the downwardly-opening sockets of the equipment support.

As shown in FIG. 15, the front wall 422 of the equipment support 420 has upper and lower pin-receiving cavities or pockets 460, 462. As diagrammatically shown in FIG. 17, downwardly-facing walls 461, 463 of the upper and lower pockets 460, 462 are formed to include downwardly-opening upper and lower sockets 464 466, respectively. The downwardly-opening sockets 465, 467 are spaced outwardly from back walls 465, 467 of the respective pockets 460, 462. The downwardly-opening sockets 465, 467 are configured to removably receive upwardly-extending upper and lower pins 594, 596 (FIGS. 13, 14, and 17) of the wall arm system 32, respectively, when the equipment support 420 is lifted off the floor 28 by the wall arm system 32 as shown, for example, in FIG. 11. As shown in FIG. 17, the downwardly-opening sockets 465, 467 are vertically aligned. Likewise, the upwardly-extending pins 594, 596 are vertically aligned.

As shown in FIGS. 11-12, the back wall 424 of the equipment support 420 has four upper and lower hooks 474, 476 which have associated downwardly-opening slots 478, 480 to removably receive four laterally-extending upper and lower pins 524, 526 carried by a telescoping column or lift 510 of the bed 30, respectively, when the equipment support 420 is lifted off the floor 28 by the bed 30 as shown, for example, in FIG. 14-16. The four upper and lower hooks 474, 476 are arranged in two rows, with two hooks 474 in an upper row and two hooks 476 in a lower row. The upper and lower hooks 474, 476 on the left side 416 are vertically aligned and the upper and lower hooks 474, 476 on the right side 418 are vertically aligned. Likewise, the four upper and lower pins 524, 526 of the lift 510 are arranged in two rows, with two pins 524 in an upper row and two pins 526 in a lower row. The upper and lower pins 524, 526 on the left side 166 are vertically aligned and the upper and lower pins 524, 526 on the right side 168 are vertically aligned.

The bed 30 shown in FIGS. 11-16 is similar to the bed 30 shown in FIGS. 2-10, except that the support structure 200 shown in FIGS. 2-10 is replaced with a support structure 500 shown in FIGS. 11-16. As shown in FIG. 16, the support structure 500 includes a flange or shelf 502 that extends generally horizontally outwardly from the head end 162 of the lower frame 150. A turntable 504 is mounted on the flange 502 for pivoting movement about a generally vertical pivot axis 506. An arm 508 is coupled to the turntable 504 for pivoting movement therewith. In the illustrated embodiment, the arm 508 is non-telescopic. In some embodiments, however, the arm 508 is telescopic. Illustratively, the arm 508 is manually pivoted about the pivot axis 506. In some embodiments, however, the pivoting movement of the arm 508 is under the power of an electric motor or other suitable driver. The arm 508 is pivotable between a position (not shown) on the left side 166 of the bed 30 and a position on the right side 168 of the bed 30 as shown in FIG. 16, through an intermediate position near the head end 162 of the bed 30 as shown in FIGS. 11-15.

As shown in FIG. 16, the lift 510 of the support structure 500 comprises an inner tube 512 extending upwardly from a terminal portion 516 of the arm 508 and an outer tube 514 sleeved over the inner tube 512 and configured to telescope relative thereto under the power of an electric motor or other suitable driver (such as the actuator 256 shown in FIG. 20) housed in the inner tube 512. In other embodiments, however, this arrangement of the inner/outer tubes of the lift 510 may be reversed. The lift 510 is supported by the arm 508 outside a footprint of the upper frame 152.

A pair of C-shaped push handles 518 extend outwardly from opposite sides of an upper portion 520 of the outer tube 514 of the lift 510. Each push handle 518 has a handgrip 522 made of soft rubber or plastic to provide a comfortable grip. The handgrips 522 are grippable by a caregiver to maneuver the bed 30 along the floor 28. In the illustrated embodiment, one or both push handles 518 are coupled to one or more load cells or other types of force sensors (such as the load cells 190 shown in FIG. 19) to provide one or more input signals to the controller 192 (FIG. 19) associated with the motorized traction system 188 (FIG. 19). As previously indicated, the motorized traction system 188 is operable to propel the bed 30 along the floor 28.

In the illustrated embodiment, the lift motor (such as the actuator 256 shown in FIG. 20) is actuated by user controls (such as the user controls 310 shown in FIG. 7) mounted on a control panel (not shown) located on the upper portion 520 (FIG. 16) of the outer tube 514 of the lift 510. Alternatively and/or additionally, in some embodiments, the user controls are located on a wired or wireless remote control device (not shown). Illustratively, the user controls include a column Up-button (such as the column Up-button 314 shown in FIG. 7) to raise the outer tube 514 of the lift 510 and a column Down-button (such as the column Down-button 316 shown in FIG. 7) to lower the outer tube 514 of the lift 510. Also, the user controls include a foot section extension button (such as the foot section extension button 318 shown in FIG. 7) to increase the length of the foot section 160 (FIG. 18) and a foot section retraction button (such as the foot section retraction button 320 shown in FIG. 7) to decrease the length of the foot section 160.

In embodiments where the arm 508 is telescopic and the telescoping movement of the arm 508 is under the power of an electric motor or other suitable driver, the user controls may include an arm In-button to cause the arm 508 to retract to move the lift 510 and the equipment support 420 closer to the bed 30 and an arm Out-button 300 to cause the arm 508 to extend to move the lift 510 and the equipment support 420 away from the bed 30. Also, in embodiments where the pivoting movement of the arm 508 is under the power of an electric motor or other suitable driver, the user controls may include an arm Left-button to cause the arm 508 to pivot to the left side 166 of the bed 30 and an arm Right-button to cause the arm 508 to pivot to the right side 168 of the bed 30.

As shown in FIGS. 11-13, the outer tube 514 of the lift 510 has laterally-extending upper and lower pins 524, 526 which are configured to be removably received in the downwardly-opening slots 478, 480 in the respective upper and lower hooks 474, 476 of the equipment support 420 when the equipment support 420 is carried by the bed 30 as shown, for example, in FIGS. 14-16. The laterally-extending upper and lower pins 524, 526 are sized for close fit sliding reception into the downwardly-opening slots 478, 480 in the respective upper and lower hooks 474, 476 when the equipment support 420 is lifted off the floor 28 by the bed 30. The downwardly-opening slots 478, 480 are flared outwardly to compensate for any misalignment between the laterally-extending upper and lower pins 524, 526 and the downwardly-opening slots 478, 480 as the equipment support 420 is lifted off the floor 28 by the bed 30.

As shown in FIGS. 11-12, the four upper and lower pins 524, 526 are arranged in two rows, with two pins 524 in the upper row and two pins 526 in the lower row. The upper and lower pins 524, 526 on the left side 166 are vertically aligned and the upper and lower pins 524, 526 on the right side 168 are vertically aligned. The upper and lower pins 524, 526 extend horizontally outwardly from the sides 166, 168 of the outer tube 514 of the lift 510. Likewise, the four upper and lower hooks 474, 476 are arranged in two rows, with two hooks 474 in the upper row and two hooks 476 in the lower row. The upper and lower hooks 474, 476 on the left side 416 are vertically aligned and the upper and lower hooks 474, 476 on the right side 418 are vertically aligned.

The horizontal spacing between the hooks 474, 476 and the horizontal spacing between the pins 524, 526 are about equal. The horizontal spacing between the hooks 474, 476 is slightly greater than the width of the outer tube 514 of the lift 510 so that the hooks 474, 476 are disposed on the opposite sides of the outer tube 514 when the equipment support 420 is moved to a position where the downwardly-opening slots 478, 480 in the upper and lower hooks 474, 476 of the equipment support 420 are positioned generally above the respective laterally-extending upper and lower pins 524, 526 of the lift 510 as shown in FIG. 13. In addition, the vertical spacing between the hooks 474, 476 and the vertical spacing between the pins 524, 526 are about equal so that the weight of the equipment support 420 is equally shared by the four pins 524, 526 when the equipment support 420 is carried by the bed 30. Also, the vertical spacing between the upper and lower hooks 474, 476 is sufficient to allow the upper pins 524 to move to a position between the upper and lower hooks 474, 476 prior to the lift 510 being operated to raise the upper and lower pins 524, 526 for reception into the downwardly-opening slots 478, 480 in the respective upper and lower hooks 474, 476.

In some embodiments, the back wall 424 of the equipment support 420 has vertically-aligned horizontally-extending upper and lower pins (not shown) and the outer tube 514 of the lift 510 has vertically-aligned upper and lower hooks (not shown) having upwardly-opening slots which are configured to removably receive the respective horizontally-extending upper and lower pins of the equipment support 420. In other embodiments, the back wall 424 of the equipment support 420 has vertically-aligned upper and lower collars (not shown) having associated openings and the outer tube 514 of the lift 510 has vertically-aligned upper and lower upwardly-extending pins (not shown) which are configured to be removably received in the respective openings in the upper and lower collars of the equipment support 420. In still other embodiments, the back wall 424 of the equipment support 420 has vertically-aligned downwardly-extending pins (not shown) and the outer tube 514 of the lift 510 has vertically-aligned upper and lower collars (not shown) having associated openings which are configured to removably receive the respective upper and lower downwardly-extending pins of the equipment support 420. The upwardly and downwardly-extending pins and/or the associated openings or sockets may be tapered in some embodiments.

The wall arm system 32 shown in FIGS. 11-14 is similar to the wall arm system 32 disclosed in FIGS. 2-5, except that the service head 360 shown in FIG. 5 is replaced with a service head 560 shown in FIGS. 11-14. As shown generally in FIGS. 11-14 and particularly in FIGS. 13-14, the service head 560 comprises an elongated upper body section 562 and a lift 580 that extends downwardly from the elongated upper body section 562. The elongated upper body section 562 includes a plurality of electrical outlets (not shown), a plurality of gas outlets 566, a plurality of accessory mounting tracks (not shown), a plurality of accessory mounting rails (not shown), and a handle (not shown) coupled to an accessory mounting track (not shown). As shown in FIGS. 13-14, in the illustrated embodiment, the lift 580 has an inner tube 582 that extends downwardly from the elongated upper body section 562 and an outer tube 584 sleeved over the inner tube 582 and configured to telescope relative to the inner tube 582 under the power of an electric motor or other suitable driver (such as the linear actuator 256 shown in FIG. 20) housed in the inner tube 582. In other embodiments, however, this arrangement of the inner/outer tubes of the lift 580 may be reversed.

As shown on FIGS. 13-14, a pair of upper and lower flanges 595, 597 extend outwardly from a bracket 598 attached to the outer tube 584 of the lift 580. A pair of upper and lower pins 594, 596 extend upwardly from the respective flanges 595, 597. The upper and lower pins 594, 596 are vertically aligned as shown in FIG. 17. The upwardly-extending upper and lower pins 594, 596 are configured to be removably received in the downwardly-opening upper and lower sockets 464, 476 located in the respective upper and lower pockets 460, 462 formed in the front wall 422 of the equipment support 420 when the equipment support 420 is lifted off the floor 28 by the lift 580 of the wall arm system 32 as shown, for example, in FIG. 11. The upwardly-extending pins 594, 596 and/or the associated downwardly-opening sockets 464, 466 may be tapered in some embodiments.

The flanges 595, 597 carrying the upper and lower pins 594, 596 of the wall arm system 32 are positioned within the respective upper and lower pockets 460, 462 formed in the front wall 422 of the equipment support 420 when the equipment support 420 is moved to a position where the downwardly-opening sockets 464, 466 in the respective upper and lower pockets 460, 462 are located generally above the upwardly-extending upper and lower pins 594, 596 of the wall arm system 32. In some embodiments, the front wall 422 of the equipment support 420 has vertically-aligned downwardly-extending upper and lower pins (not shown) and the outer tube 584 of the lift 580 has vertically-aligned upper and lower flanges or collars (not shown) having openings for receiving the downwardly-extending upper and lower pins of the equipment support 420. The downwardly-extending upper and lower pins and/or the associated openings in the upper and lower collars may be tapered in some embodiments.

The vertical telescoping movement of the lift 580 of the wall arm system 32 permits the equipment support 420 to be: 1) lifted off the floor 28 and attached to the lift 580, 2) detached from the lift 580 and lowered onto the floor 28, 3) detached from the lift 580 and attached to the bed 30, and 4) detached from the bed 30 and reattached to the lift 580. The pivoting movement of the arm 352 about the vertical axis 354, the horizontal telescoping movement of the arm 352, and the vertical telescoping movement of the lift 580 allow the equipment support 420 to be positioned at any desirable location within a range of movements. In the illustrated embodiment, a user control (not shown) for operating the lift 580 is located on the service head 560. Alternatively, the lift 580 may be operated by a wired or wireless remote control (not shown).

When the equipment support 420 is supported on the floor 28, the equipment support 420 can be lifted off the floor 28 either by the lift 510 of the bed 30 or by the lift 580 of the wall arm system 32. To transfer the equipment support 420 from a position where the equipment support 420 is supported on the floor 28 as shown in FIG. 12 to a position where the equipment support 420 is carried by the lift 510 of the bed 30 as shown in FIGS. 14-16, the equipment support 420 is moved to a position where the oppositely-disposed laterally-extending upper and lower pins 524, 526 of the lift 510 are positioned generally below the downwardly-opening slots 478, 480 in the respective upper and lower hooks 474, 476 of the equipment support 420 as shown in FIG. 13 and the outer tube 514 of the lift 510 is raised to lift the equipment support 420 off the floor 28 as shown in FIGS. 14-16. When the equipment support 420 is lifted off the floor 28, the support legs 24 extend generally vertically downwardly as shown in FIGS. 14-16.

To transfer the equipment support 420 from a position where the equipment support 420 is carried by the lift 510 of the bed 30 as shown in FIGS. 14-16 to a position where the equipment support 420 is lowered onto the floor 28 as shown in FIGS. 12-13, the outer tube 514 of the lift 510 carrying the equipment support 420 is lowered until the laterally-extending upper and lower pins 524, 526 of the lift 510 are located below the upper and lower hooks 474, 476 of the equipment support 420 and the equipment support 420 is fully supported on the floor 28. When the laterally-extending upper and lower pins 524, 526 of the lift 510 are located below the upper and lower hooks 474, 476 of the equipment support 420 and the equipment support 420 is supported on the floor 28 as shown in FIGS. 12-13, the equipment support 420 can be rolled along the floor 28 to another location. When the equipment support 420 is supported on the floor 28, the support legs 24 extend generally horizontally outwardly as shown in FIGS. 12-13.

To transfer the equipment support 420 from a position where the equipment support 420 is supported on the floor 28 as shown in FIG. 13 to a position where the equipment support 420 is carried by the lift 580 of the wall arm system 32 as shown in FIG. 11, the equipment support 420 is moved to a position where the upwardly-extending upper and lower pins 594, 596 of the lift 580 are positioned generally below the downwardly-opening upper and lower sockets 464, 466 in the respective upper and lower pockets 460, 462 formed in the front wall 422 of the equipment support 420 as shown in FIG. 17 and the outer tube 584 of the lift 580 is raised to lift the equipment support 420 off the floor 28 as shown in FIG. 11. The flanges 595, 597 carrying the upper and lower pins 594, 596 of the wall arm system 32 are positioned within the respective upper and lower pockets 460, 462 formed in the front wall 422 of the equipment support 420 when the equipment support 420 is moved to a position where the upwardly-extending upper and lower pins 594, 596 of the lift 580 are positioned generally below the downwardly-opening upper and lower sockets 464, 466 in the respective upper and lower pockets 460, 462.

To transfer the equipment support 420 from a position where the equipment support 420 is carried by the lift 580 of the wall arm system 32 as shown in FIG. 11 to a position where the equipment support 420 is lowered onto the floor 28 as shown in FIG. 12, the outer tube 584 of the lift 580 carrying the equipment support 420 is lowered until the upwardly-extending upper and lower pins 594, 596 of the lift 580 are located below the downwardly-opening upper and lower sockets 464, 466 as shown in FIG. 17 and the equipment support 420 is fully supported on the floor 28 as shown in FIG. 12. When the upwardly-extending upper and lower pins 594, 596 of the lift 580 are located below the downwardly-opening upper and lower sockets 464, 466 and the equipment support 420 is supported on the floor 28 as shown in FIG. 12, the equipment support 420 can be rolled along the floor 28 to another location as shown in FIG. 13.

The equipment support 420 can be transferred directly from the wall arm system 32 to the bed 30 by either raising the outer tube 514 of the lift 510 of the bed 30 carrying the laterally-extending upper and lower pins 524, 526 or by lowering the outer tube 584 of the lift 580 of the wall arm system 32 carrying the equipment support 420 (or by a combination of the two) after moving the wall arm system 32 to a location where the laterally-extending upper and lower pins 524, 526 of the lift 510 are located generally below the downwardly-opening slots 478, 480 in the respective upper and lower hooks 474, 476 of the equipment support 420. Transfer of the equipment support 420 from the wall arm system 32 to the bed 30 by raising the outer tube 514 of the lift 510 of the bed 30 carrying the laterally-extending upper and lower pins 524, 526 will be described first. Transfer of the equipment support 20 from the wall arm system 32 to the bed 30 by lowering the outer tube 584 of the lift 580 of the wall arm system 32 carrying the equipment support 420 will be described next.

To transfer equipment support 420 from the wall arm system 32 to the bed 30, the wall arm system 32 is moved to a position where the laterally-extending upper and lower pins 524, 526 of the lift 510 of the bed 30 are located generally below the downwardly-opening slots 478, 480 in the respective upper and lower hooks 474, 476 of the equipment support 420 and the outer tube 514 of the lift 510 carrying the laterally-extending upper and lower pins 524, 526 is raised. As the outer tube 514 of the lift 510 moves upwardly, the laterally-extending upper and lower pins 524, 526 of the lift 510 enter the downwardly-opening slots 478, 480 in the respective upper and lower hooks 474, 476 of the equipment support 420 and, when this initially occurs, the upwardly-extending pins 594, 596 of the lift 580 of the wall arm system 32 are still seated firmly in the downwardly-opening sockets 464, 466 of the equipment support 420. Further upward movement of the outer tube 514 of the lift 510 causes the laterally-extending upper and lower pins 524, 526 of the lift 510 to seat firmly in the downwardly-opening slots 478, 480 in the respective upper and lower hooks 474, 476 of the equipment support 420 and causes the upwardly-extending pins 594, 596 of the lift 580 of the wall arm system 32 to disengage from the downwardly-opening sockets 464, 466 of the equipment support 420. After the upwardly-extending pins 594, 596 of the lift 580 are lowered sufficiently relative to the respective downwardly-opening sockets 464, 466 of the equipment support 420, the wall arm system 32 can then be pulled away from the bed 30 (or the bed 30 pulled away from the wall arm system 32), with the bed 30 carrying the equipment support 420. In such embodiments, where raising of the outer tube 514 of the lift 510 effects transfer of the equipment support 20 from the wall arm system 32 to the bed 30, the wall arm system 32 need not have the lift 580 for raising and lowering the upwardly-extending pins 594, 596.

Alternatively or additionally, to transfer the equipment support 420 from the wall arm system 32 to the bed 30, the wall arm system 32 is moved to a position where the laterally-extending upper and lower pins 524, 526 of the lift 510 of the bed 30 are located generally below the downwardly-opening slots 478, 480 in the respective upper and lower hooks 474, 476 of the equipment support 420 and the outer tube 584 of the lift 580 of the wall arm system 32 carrying the equipment support 420 is lowered to a position where the laterally-extending upper and lower pins 524, 526 of the lift 510 are seated firmly in the downwardly-opening slots 478, 480 in the respective upper and lower hooks 474, 476 of the equipment support 420 and the upwardly-extending pins 594, 596 of the lift 580 of the wall arm system 32 are positioned below the downwardly-opening sockets 464, 466 of the equipment support 420. The wall arm system 32 can then be pulled away from the bed 30 (or the bed 30 pulled away from the wall arm system 32), with the bed 30 carrying the equipment support 20. In such embodiments, where lowering of the outer tube 584 of the lift 580 of the wall arm system 32 effects transfer of the equipment support 420 from the wall arm system 32 to the bed 30, the bed 30 need not have the lift 510 for raising and lowering the laterally-extending upper and lower pins 524, 526.

To transfer the equipment support 420 from the bed 30 to the wall arm system 32, the sequence of steps is reversed. The equipment support 420 can be transferred from the bed 30 to the wall arm system 32 by either lowering the outer tube 514 of the lift 510 of the bed 30 or by raising the outer tube 584 of the lift 580 of the wall arm system 32 after moving the service head 560 to a location where the upwardly-extending upper and lower pins 594, 596 of the lift 580 are positioned generally below the downwardly-opening sockets 464, 466 of the equipment support 420.

The bed 30 shown in FIG. 18 is similar to the bed 30 shown in FIGS. 2-10, except that the telescoping column or lift 250 shown in FIGS. 2-10 is replaced with a lift 600 shown in FIG. 18. As shown in FIG. 18, the lift 600 comprises an inner tube 602 extending upwardly from the terminal portion 218 of the inner tube 214 of the arm 210 and an outer tube 604 sleeved over the inner tube 602 and configured to telescope relative thereto under the power of an electric motor or other suitable driver (not shown) housed in the inner tube 602. In other embodiments, however, this arrangement of the inner/outer tubes of the lift 600 may be reversed. The vertically-aligned upper and lower couplers 264, 266 are attached to the outer tube 604 of the lift 600. The upper and lower couplers 264, 266 are configured to be detachably coupled to the respective upper and lower couplers 54, 56 (FIG. 1) of the equipment support 20 when the equipment support 20 is carried by the bed 30.

The lift 600 is supported by the inner tube 214 of the arm 210 outside a footprint of the upper frame 152 as shown in FIG. 18. The outward and inward movement of the inner tube 214 of the arm 210 as the arm 210 pivots around the head end 162 of the bed 30 allows the lift 600 and the attached equipment support 20 to be swung away from the head end 162 of the bed 30 to provide improved access to a patient lying on the bed 30 while maintaining the equipment support 20 and the patient care equipment 22 close to the head end 162 of the bed 30.

As shown in FIG. 18, an upper portion 606 of the outer tube 604 of the lift 600 extends upwardly and forwardly. A pair of push handles 608 are coupled to a forwardly-facing wall 610 of the upper portion 606 of the outer tube 604 for pivoting movement about respective pivot pins 612. The push handles 608 are movable between a use position (not shown) where the push handles 608 extend generally horizontally outwardly and a storage position shown in FIG. 18 where the push handles extend generally vertically downwardly. Each push handle 608 has a handgrip 614 made of soft rubber or plastic to provide a comfortable grip. The handgrips 614 are grippable by a caregiver to maneuver the bed 30 along the floor 28. In the illustrated embodiment, one or both push handles 608 are coupled to one or more load cells or other types of force sensors (such as the load cells 190 shown in FIG. 19) to provide one or more input signals to the controller 192 (FIG. 19) associated with the motorized traction system 188 (FIG. 19). As previously indicated, the motorized traction system 188 is operable to propel the bed 30 along the floor 28.

In the illustrated embodiment, the lift motor (such as the actuator 256 shown in FIG. 20) is actuated by user controls (such as the user controls 310 shown in FIG. 7) mounted on a control panel (not shown) located on the upper portion 606 (FIG. 18) of the outer tube 604 of the lift 600. Alternatively and/or additionally, in some embodiments, the user controls are located on a wired or wireless remote control device (not shown). Illustratively, the user controls include a column Up-button (such as the column Up-button 314 shown in FIG. 7) to raise the outer tube 604 of the lift 600 and a column Down-button (such as the column Down-button 316 shown in FIG. 7) to lower the outer tube 604 of the lift 600. Also, the user controls include a foot section extension button (such as the foot section extension button 318 shown in FIG. 7) to increase the length of the foot section 160 (FIG. 18) and a foot section retraction button (such as the foot section retraction button 320 shown in FIG. 7) to decrease the length of the foot section 160.

The bed 30 and the wall arm system 32 merely illustrate the environment for the operation of the equipment support 20, 420. It will be understood that the bed 30 may very well be replaced with any one of the following: a stretcher, a surgery table, an ambulatory care chair, a wheeled carriage, and the like. Likewise, the wall arm system 32 may very well be replaced with any one of the following: a wheeled stand, a wheeled cart or dolly, and the like.

While the features or aspects of various inventions have been illustrated and described in detail in the foregoing drawings and description, the same is to be considered as illustrative and not restrictive in character, it being understood that only illustrative embodiments thereof have been shown and described and that all changes and modifications that come within the spirit of the respective inventions are desired to be protected.

The invention claimed is:

1. A patient support apparatus comprising:

a lower frame, an upper frame supported above the lower frame and configured to support a patient, a support structure coupled to the lower frame, the support structure includes a column having a movable portion that is movable generally vertically relative to the lower frame and relative to the upper frame and that includes a handle coupled to the movable portion of the column, and a motorized traction system coupled to the lower frame and operable to propel the patient support apparatus along a floor, the motorized traction system having a user input coupled to the handle, wherein the user input comprises a force sensor coupled to the handle.

2. The apparatus of claim 1, wherein the force sensor comprises a load cell.

3. The apparatus of claim 1, wherein the handle is movable between a first position and a second position, the motorized traction system is enabled when the handle is in the first position such that an input signal from the user input results in the operation of the motorized traction system to propel the apparatus along the floor, and the motorized traction system is disabled when the handle is in the second position.

4. The apparatus of claim 1, further comprising an actuator operable to raise and lower the movable portion of the column and a second user input coupled to the actuator, wherein the second user input is located on the movable portion of the column.

5. A patient support apparatus comprising:

a lower frame, an upper frame supported above the lower frame and configured to support a patient, a support structure coupled to the lower frame, the support structure includes a column having a movable portion that is movable generally vertically relative to the lower frame and relative to the upper frame and that includes a handle coupled to the movable portion of the column, and a motorized traction system coupled to the lower frame and operable to propel the patient support apparatus along a floor, the motorized traction system having a user input coupled to the handle, wherein the support structure includes an arm coupled to a head end of the lower frame for side-to-side movement and the column extends upwardly from the arm.

6. The apparatus of claim 5, further comprising a sensor configured to enable the motorized traction system when the arm is generally centered at the head end of the lower frame and configured to disable the motorized traction system when the arm is generally not centered at the head end of the lower frame.

7. A patient support apparatus comprising:

a lower frame, an upper frame supported above the lower frame and configured to support a patient, a support structure coupled to the lower frame, the support structure includes a column having a movable portion that is movable generally vertically relative to the lower frame and relative to the upper frame and that includes a handle coupled to the movable portion of the column, and a motorized traction system coupled to the lower frame and operable to propel the patient support apparatus along a floor, the motorized traction system having a user input coupled to the handle, wherein the handle is movable between a use position and a storage position, and the apparatus further comprises a sensor configured to enable the motorized traction system when the handle is in the use position and configured to disable the motorized traction system when the handle is in the storage position.

8. A patient support apparatus comprising:

a lower frame, an upper frame supported above the lower frame and configured to support a patient, a support structure coupled to the lower frame, the support structure includes a column having a movable portion that is movable generally vertically relative to the lower frame and relative to the upper frame and that includes a handle coupled to the movable portion of the column, a motorized traction system coupled to the lower frame and operable to propel the patient support apparatus along a floor, the motorized traction system having a user input coupled to the handle, and a deck supported by the upper frame, the deck having a foot section that extends and retracts, a second user input for extending and retracting the foot section, and the second user input being coupled to the movable portion of the column.

9. The apparatus of claim 8, wherein the second user input includes a foot section extension button to increase the length of the foot section and a foot section retraction button to decrease the length of the foot section.

10. A patient support apparatus comprising:

a lower frame, an upper frame supported above the lower frame and configured to support a patient, a support structure coupled to the lower frame, the support structure includes a column having a movable portion that is movable generally vertically relative to the lower frame and relative to the upper frame and that includes a handle coupled to the movable portion of the column, and a motorized traction system coupled to the lower frame and operable to propel the patient support apparatus along a floor, the motorized traction system having a user input coupled to the handle, wherein the support structure has an arm extending outwardly from the lower frame so that at least a portion of the arm extends outside a footprint of the upper frame, and the column extends upwardly from the portion of the arm extending outside the footprint of the upper frame, wherein the arm is coupled to the lower frame for side-to-side movement between a first position on a first side of the lower frame and a second position on a second side of the lower frame through a central position near a head end of the lower frame.

11. The apparatus of claim 10, wherein the arm has a first portion coupled to the lower frame for pivoting movement about a generally vertical axis and a second portion that is movable relative to the first portion along a longitudinal axis of the arm, and the movable second portion of the arm carries the column.

12. The apparatus of claim 11, further comprising linkage coupled to the lower frame and coupled to the second portion of the arm carrying the column, wherein pivoting movement of the first portion of the arm causes the linkage to move the second portion of the arm carrying the column along the longitudinal axis of the arm.

13. The apparatus of claim 12, wherein the linkage comprises a frame member coupled to the lower frame and having a track and a pin coupled to the movable second portion of the arm and riding in the track.

14. The apparatus of claim 10, further comprising an actuator operable to pivot the arm about the generally vertical axis and a second user input coupled to the actuator, wherein the second user input is located on the movable portion of the column.

15. A patient support apparatus comprising:

a lower frame, an upper frame supported above the lower frame and configured to support a patient, a support structure coupled to the lower frame, the support structure includes a column having a movable portion that is movable generally vertically relative to the lower frame and relative to the upper frame and that includes a handle coupled to the movable portion of the column, a motorized traction system coupled to the lower frame and operable to propel the patient support apparatus along a floor, the motorized traction system having a user input coupled to the handle, and a patient care equipment support that is selectively coupleable to and decoupleable from the movable portion of the column.

16. A patient support apparatus comprising:

a lower frame, an upper frame supported above the lower frame and configured to support a patient, a deck supported above the upper frame, the deck having a foot section that extends and retracts, a support structure coupled to the lower frame, the support structure including a column having a movable portion that is movable generally vertically relative to the lower frame and relative to the upper frame, a user input for extending and retracting the foot section being coupled to the movable portion of the column.

17. The apparatus of claim 16, wherein the user input includes a foot section extension button to increase the length of the foot section and a foot section retraction button to decrease the length of the foot section.

* * * * *